United States Patent
Prout, Jr.

(10) Patent No.: US 7,997,311 B2
(45) Date of Patent: Aug. 16, 2011

(54) SELF-PROPELLED CLIMBING APPARATUS FOR STRIPPING, TRIMMING AND COATING PALM TREES

(76) Inventor: Edward L. Prout, Jr., Campbell, CA (US)

(*) Notice: Subject to any disclaimer, the term of this patent is extended or adjusted under 35 U.S.C. 154(b) by 682 days.

(21) Appl. No.: 11/592,440

(22) Filed: Nov. 3, 2006

(65) Prior Publication Data

US 2008/0105491 A1 May 8, 2008

(51) Int. Cl.
*B27L 1/00* (2006.01)
(52) U.S. Cl. .................................... 144/208.2
(58) Field of Classification Search ............... 144/208.2, 144/208.4, 24.13; 47/1.01 R
See application file for complete search history.

(56) References Cited

U.S. PATENT DOCUMENTS

| | | | |
|---|---|---|---|
| 2,581,479 A * | 1/1952 | Grasham ................. | 47/1.01 R |
| 2,583,971 A | 1/1952 | Shuff | |
| 2,612,724 A * | 10/1952 | Llewellyn ................ | 47/1.01 R |
| 2,727,335 A * | 12/1955 | Susil ........................ | 47/1.01 R |
| 3,117,401 A * | 1/1964 | Talley ..................... | 451/415 |
| 3,364,962 A | 1/1968 | Otterbach et al. | |
| 3,457,973 A | 7/1969 | Meier | |
| 3,461,925 A * | 8/1969 | Fend ........................ | 144/24.13 |
| 3,500,883 A | 3/1970 | Herolf et al. | |
| 3,545,509 A | 12/1970 | Baxter, Jr. | |
| 4,050,485 A * | 9/1977 | Valo ......................... | 144/24.13 |
| 4,279,281 A | 7/1981 | Nakamura | |
| 4,690,184 A | 9/1987 | Fuminao | |
| 4,735,244 A | 4/1988 | Kacer, Sr. | |
| 5,184,656 A | 2/1993 | Young | |
| 5,438,793 A | 8/1995 | Eliachar et al. | |
| 5,983,966 A | 11/1999 | Clouston | |
| 6,474,377 B1 | 11/2002 | Van De Mortel | |
| 6,672,346 B1 | 1/2004 | Heckmaier | |
| 7,422,041 B2 * | 9/2008 | Smith et al. ............. | 144/343 |

* cited by examiner

*Primary Examiner* — Shelley Self
(74) *Attorney, Agent, or Firm* — Richard A. Ryan

(57) ABSTRACT

A self-propelled climbing apparatus for performing a maintenance operation on a palm tree comprises a climbing section that moves up and down the tree and a maintenance section that performs the desired operation. The climbing section has a main support frame with climbing mechanisms attached thereto. The climbing mechanism has upper and lower wheels that engage the trunk and are operated by a drive mechanism that rotates the wheels. Springs pull the upper and lower wheels toward each other to maintain their engagement with the trunk. The maintenance section rotatably and detachably mounts to a head support rail supported above the climbing section. In one embodiment, the maintenance section is a cutting head having a cutting mechanism at the upper end of a pivoting cutting arm to cut wrapping and/or fronds from the trunk. A tent assembly directs debris directly downward to prevent injury or damage and ease cleanup.

22 Claims, 14 Drawing Sheets

US 7,997,311 B2

SELF-PROPELLED CLIMBING APPARATUS FOR STRIPPING, TRIMMING AND COATING PALM TREES

CROSS-REFERENCE TO RELATED APPLICATIONS

None.

BACKGROUND OF THE INVENTION

A. Field of the Invention

The field of the present invention relates generally to apparatuses utilized for maintenance of palm trees, such as stripping, trimming and coating palm trees. More particularly, the present invention relates to such apparatuses that are self-propelled and configured to climb the trunk of the palm tree to perform the desired maintenance operation. Even more particularly the present invention relates to such self-propelled climbing apparatuses that have a climbing base section that climbs the trunk and an interchangeable maintenance head section that is adapted to perform one or more palm tree maintenance operations.

B. Background

Many homes, resorts and businesses have one or more palm trees as part of the landscaping because of their beauty and the ambiance they create, namely that of a serene, tropical location. Palm trees typically have a trunk with a crown at the top comprising a plurality of palm fronds, with the crown of some varieties of palm trees reaching heights of sixty feet or more. As the tree grows, the palm fronds need to be removed, leaving the trunk covered with palm wrappings that are connected to the trunk by fibers, commonly referred to as paper, that grow into the tree. At higher levels, such as above sixty feet, the palm fronds and wrapping will fall out on their own, a process referred to as natural stripping, due to the nesting of squirrels, rats and birds. While the shedding process happens naturally at the higher tree levels, at the lower levels and for lower height trees the palm fronds that are hanging down must be removed by the owner or someone on his or her behalf. Although the dead or dying palm fronds and the wrapping can be left on the palm tree trunk, most people prefer the look of a clean trunk. Even at the higher levels, where waiting for the palm fronds and/or wrapping to fall off naturally is less expensive and/or less trouble from a maintenance perspective, most people still prefer to either remove the fronds and wrapping themselves or pay someone to perform this service. Besides the preference for the look of a "clean" trunk, many people would rather have the fronds and wrapping removed than to risk them falling at an inopportune time, for instance when someone is walking by or has parked their car under the palm tree. In fact, do to the risk of injury or damage from falling fronds and/or wrapping, many municipalities, including some municipalities that are famous for their palm trees, have laws or regulations that require the owner of a palm tree to maintain it so as to prevent the fronds and/or wrapping from falling on pedestrians or cars parked underneath.

Palm tree maintenance can take on many forms depending on the type of palm tree and/or the use of the palm tree. The most common forms of palm tree maintenance is stripping the wrapping from the trunk and trimming the palm fronds off of the tree. In addition, although not presently available, many people would also prefer to coat the trunk of the palm tree with a substance that helps protect the trunk, particularly once the naturally protective wrapping is removed, from the sun and invasive molds and fungi. In addition to protective coatings, some people, businesses or municipalities cover (i.e, spray) the trunk with a decorative coating, such as a paint, even if temporarily for the season. Likewise, palm tree trunks can be wrapped with a decorative material or have a string of lights placed around the trunk to enhance their beauty. As readily understood by those skilled in the art, the latter forms of palm tree maintenance, namely coating, spraying and wrapping the palm tree trunk, are better performed with the wrapping and low hanging palm fronds removed from the tree, leaving a generally clean and smooth trunk surface.

Depending on the variety of palm tree, it usually does not take very long before the palm tree rises above a height where maintenance can no longer be performed from the ground. From that point forward, the person performing the maintenance must go up to the level at which the work is desired. In the past, this was primarily performed by persons who would climb the palm tree trunk with his or her knife, saw and/or other cutting implement and cut the palm wrapping and fronds off next to the trunk to achieve the desired or required smooth trunk surface. Unfortunately, climbing up the trunk to the level where the work is desired often required the person to climb up thirty to sixty feet, or more. The equipment used for climbing the tree, namely spiked shoes and a safety belt, had the negative consequence of leaving holes in the trunk and was considered quite dangerous. Due to the inherent danger of such work and the many injuries that occurred to those in the industry, this method of palm tree maintenance has been substantially eliminated in many locations as a result of excessively high workers' compensation insurance rates and state or municipal laws and regulations. Most modern palm tree maintenance operations utilize a mechanical hoist or other lifting equipment to raise the maintenance person, and his or her tools, to the level at which the work is to be performed. Naturally, there are limits to how high a hoist or lift can raise a person for him or her to utilize their cutting tools to remove palm wrapping and fronds. In addition to the practical or equipment limits, a number of municipalities have passed laws that prevent a person from being raised more than a set distance, such as thirty feet, above the ground to perform palm tree maintenance. In these locations, above that point no palm tree maintenance can take place. When combined with the laws or regulations requiring palm trees to be cleaned to prevent falling wrapping or fronds, the two sets of laws or regulations have the effect of limiting the height of a palm tree in that municipality. Because palm trees keep growing above this height limit, trees above a certain height must be removed from the ground, which can be a substantial cost for the palm tree owner. Generally, younger and shorter trees are planted to replace the removed trees.

Over the years, various apparatuses have been developed to strip and/or trim palm trees without the need for a person climbing or being raised to the level where the work is performed. For instance, U.S. Pat. No. 6,672,346 to Heckmaier describes a palm tree trimming machine that comprises a resilient frame that is made up of resilient alignment bar assemblies and spring tensioner assemblies that hold the frame and drive assemblies, each comprising a motor and a drive wheel, close to the trunk. A saw assembly and bus assembly attach to the frame. The drive wheels spiral around the trunk to climb the tree to place the saw assembly, having a rotating saw blade, in position to trim tree material off of the trunk. U.S. Pat. No. 6,474,377 to Van De Mortel describes a self-propelled climbing tree trimmer that comprises a split support ring that is hingedly connected around the tree to support a number of pivoting knife blades and a plurality of traction arms. The knife blades are attached to a ring gear and are configured to engage and cut fronds or branches from the tree. Each of the traction arms have a toothed traction wheel at its lower end that, collectively, are utilized to propel the apparatus up the tree. U.S. Pat. No. 5,983,966 to Clouston describes a self-propelled tree pruning apparatus having a frame, a pair of driven wheels and a pair of hugger wheels, each rotatably attached to the frame, that are urged together by an air bag and a cutting tool with helical edges. In use, the driven wheels and hugger wheels are on opposite sides of the trunk and driven up the tree in a helical path so that the cutting tool may cut the fronds or limbs. U.S. Pat. No. 4,690,184 to Fuminao describes a pruning machine having an elevating body with a rotary device detachably mounted on the body and a plurality of elevating wheels that move up the tree trunk to place the cutting unit, having a saw chain, in position to trim branches from the tree.

Problems with the known prior art devices, such as those set forth above, include uneven cutting of the palm fronds, damage to the trunk that results in a non-attractive, non-smooth surface, inconsistent climbing and cutting and/or apparatuses which are too complex to work reliably for their intended purpose and be cost effective to manufacture. In addition, the known prior art is limited to apparatuses for trimming or cutting fronds and branches from trees, with no capability to provide other maintenance operations. What is needed, therefore, is an improved self-propelled climbing apparatus that is configured with a climbing section that effectively climbs the trunk of a tree and a detachable cutting section which is configured to more effectively remove palm wrapping and fronds from palm trees. The preferred apparatus will be relatively easy to install around the trunk of a tree so as to engage the tree for climbing the trunk. Preferably, the climbing apparatus is configured to adapt to different size tree trunks and to changes in the trunk size as the apparatus climbs the tree. The preferred climbing apparatus will be configured for remote operation of both the climbing mechanism and the cutting mechanism to selectively move up the trunk and cut the wrapping and fronds from the trunk. The preferred climbing apparatus will be adaptable to a variety of different detachable head sections that are configured to remove wrapping, cut fronds, spray protective coating on the clean trunk, spray other coatings and paint materials on the trunk, and install decorative lights or wraps on the trunk. Preferably, the climbing apparatus will be configured to provide a consistent, uniform operation along the tree trunk and from one tree to another. The preferred climbing apparatus should include a protective tent or tent-like device to direct cut debris from the climbing apparatus directly to the ground below the palm tree to reduce or eliminate the likelihood of injury to nearby persons and damage to nearby property.

SUMMARY OF THE INVENTION

The self-propelled climbing apparatus for stripping, trimming and coating palm trees of the present invention solves the problems and provides the benefits identified above. That is to say, the present invention discloses a self-propelled climbing apparatus having a climbing section configured to effectively ascend and descend the trunk of a palm tree and a maintenance section that detachably mounts to the climbing section to perform a maintenance operation on the palm tree. In one embodiment, the maintenance section includes a cutting head that is configured for stripping palm wrapping and trimming palm fronds from the trunk of a palm tree. Other cutting heads can be utilized to perform other desired operations, such as coating the trunk or stringing lights or banners thereon. In a preferred embodiment, the climbing section includes a base having a support ring that is configured to open around the tree trunk for ease of installation and support a plurality of climbing mechanisms and the cutting head as it climbs the tree and cuts wrapping and fronds from the trunk. The preferred embodiment of the present invention has climbing mechanisms that are configured to climb heightwise up the trunk of the tree and a cutting head that rotatably mounts on the support ring to move rotating saw blades into position to cut wrapping and/or fronds. Preferably, a plurality of electric motors are utilized to drive the climbing mechanism, rotate the cutting head and rotate the saw blades. The preferred embodiment also includes a tent support ring to which can be attached a tent for reducing or preventing injury to nearby persons or damage to nearby property, such as cars and the like, and for ease of cleanup. Typically, one or more tarps or the like will be placed on the ground at the bottom of the palm tree below the climbing apparatus to further ease cleanup of the debris cut from the tree.

In one general aspect of the present invention, the self-propelled climbing apparatus comprises a climbing section that is configured to climb up and down the trunk of a palm tree and a maintenance section that is configured to perform one or more maintenance operations on the palm tree. In a preferred embodiment, the climbing section comprises a main support frame that supports one or more climbing mechanisms that are configured to engage the trunk and move the apparatus up or down the tree. The main support frame, which defines a ring-like configuration that goes around the trunk of the palm tree, is configured to pivotally separate into two or more separate support sections so that it may be placed around the trunk. Preferably, the support sections are joined by a support hinge that has a removable support pin that is removed to allow the sections to separate and be placed around the trunk. With the support sections rejoined, the climbing mechanism engages the surface of the trunk to hold the climbing section in place. Each of the climbing mechanisms comprise one or more upper wheels positioned above the main support frame at the upper end of an arm and one or more lower wheels positioned below the main support frame at the lower end of an arm. The upper and lower wheels are engaged against the trunk by the biasing force of one or more springs, such as an upper spring and a lower spring, that pulls the upper and lower wheels generally toward each other against the trunk. The biasing force maintains the climbing mechanism in operative engagement with the trunk. A drive mechanism connects to upper and lower drive assemblies to rotate the upper and lower wheels, respectively, against the trunk to move the climbing section up and down the palm tree. An electric motor and associated chain/sprocket drive assemblies are utilized to provide the necessary drive force to move the climbing apparatus up and then back down the trunk of a palm tree. If desired, laterally disposed springs or other biasing devices are utilized to interconnect the climbing mechanisms in a circular manner around the tree and, if more than one arm is utilized, to interconnect the arms.

The maintenance section, which in a preferred embodiment is a cutting head, rotatably and detachably mounts to a head support rail that is supported in spaced apart relation above the main support frame by the use of a plurality of head support members that interconnect the head support rail and the main support frame. The head support members are attached to the head support rail in a manner that does not inhibit or interfere with the rotation of the maintenance section thereon. The preferred maintenance section comprises a head support frame that has a plurality of upper rail rollers which rotatably rest on the top side of the head support rail and a rotating motor, connected to one or more drive rollers, that is configured to rotate the maintenance section around the head support rail during the desired maintenance operation.

As with the main support frame, the head support frame is configured with hinge mechanisms that allow the generally ring-like head support frame to be opened for placement around the trunk of a palm tree. One or more head clamping mechanisms are utilized to rotatably secure the head support frame of the maintenance section to the head support rail. In a preferred embodiment, the head clamping mechanism comprises a clamp that is operated by a handle to secure a clamping roller on the bottom side of the head support rail, thereby rotatably engaging the head support frame between the upper rail rollers and the clamping rollers. With the rotating motor operating, the drive roller will rotate the maintenance section around on the head support rail in a manner that prevents unintended disengagement thereof.

As stated above, in a preferred embodiment of the present invention the maintenance section comprises a cutting head that is configured to strip wrapping from the trunk and/or trim fronds from the tree. The preferred cutting head comprises a cutting mechanism that is pivotally attached to the upper end of a cutting arm, which is pivotally connected at its lower end to the head support frame. The pivotal attachment of cutting mechanism and cutting arm allows the position of cutting mechanism to be adjusted relative to the trunk and/or material to be cut from the trunk. The preferred cutting mechanism comprises an electric motor operatively attached to a rotating saw blade. A blade guard, having an outwardly extending trunk face member for abutting the trunk, separates the saw blade from the motor, to protect it from damage. A portion of the saw blade extends through a slot in the trunk face to engage and cut the wrapping and/or fronds from the trunk without damaging the trunk.

A control unit is mounted onto the climbing apparatus, such as to the main support frame, to allow control of the various operations of the climbing apparatus, such as selectively ascending or descending the trunk, rotation of the maintenance section relative to the climbing section, raising and lowering of the cutting arms and/or the operation of the cutting mechanism. The control unit on the climbing apparatus connects, either by a control wire or wirelessly, to a hand control unit that is held and operated by the user, which in turn connects to a source of electrical power, such as a generator or an outlet. With the control unit, the user can safely and effectively operate the climbing apparatus from the ground to perform the desired maintenance operation without having to climb the palm tree. For additional safety, a tent assembly is utilized to direct the cut debris downward through a debris chamber to the bottom of the palm tree so as to avoid causing injury to others or harm to property. In a preferred embodiment, the tent assembly comprises a tent-like cover, made out of plastic or cloth, that attaches to a tent support ring mounted on the climbing apparatus. In a preferred configuration, the tent support ring mounts to the main support frame by utilizing one or more ring support members that extend both upwardly and outward from the main support frame to place the tent support ring, and therefore the top of the tent, above the cutting action of the saw blades.

In use, the user clears a section of the trunk near the bottom of the palm tree for placement of the climbing apparatus thereon and positioning of its components. First, the climbing section is placed on the trunk. The ring-like configuration of the main support frame is opened and the main support frame is placed around the trunk with the upper and lower wheels in engagement with the trunk. The biasing force of the springs will pull the upper and lower wheels toward each other, thereby engaging the wheels against the trunk and securing climbing section in place. Once the climbing section is secured, the desired maintenance section, such as the cutting head, is detachably mounted onto the head support rail of the climbing section by placing the upper rail rollers on the top side of the head support rail and clamping the clamping rollers to its bottom side, thereby rotatably securing the head support rail between the rollers. The cutting arm and/or the cutting mechanism are pivoted to place the saw blade of the cutting mechanism in the desired position relative the trunk and an increment movement amount, which is dependent on the particular palm tree, is set for the movement of the climbing mechanism up the trunk. The tent is attached to the tent support ring to define the debris chamber. The user then operates the hand control unit to start the climbing mechanism moving up the tree. Once it is at the location where the maintenance is desired, the climbing apparatus moves up the increment amount and then stops in place while the maintenance, such as the cutting operation is performed, with the rotation of the maintenance section on the head support rail. Once the maintenance is performed, the cycle is repeated up the trunk until the entire maintenance operation is completed. The climbing apparatus is then directed down the trunk, the control unit is disconnected from the source of electrical power and the tent is removed from the tent support ring. The ring-like maintenance section is then disengaged from the head support rail, pivoted open and removed from the trunk. With the maintenance section removed, the climbing section is pivoted open and removed from the trunk.

Accordingly, the primary objective of the present invention is to provide a self-propelled climbing apparatus for stripping, trimming and coating palm trees that provides the advantages discussed above and overcomes the disadvantages and limitations associated with presently available self-propelled palm tree apparatuses.

It is also an important object of the present invention to provide a self-propelled palm tree climbing apparatus that allows an operator to safely direct the apparatus up the trunk of the tree to effectively perform one or more maintenance operations without the operator having to climb the tree or be raised off the ground.

It is also an important object of the present invention to provide a self-propelled palm tree climbing apparatus that comprises a climbing section configured to ascend and descend the trunk of a palm tree and a maintenance section configured to perform one or more maintenance operations on the tree, such as stripping the palm wrapping from the tree and/or trimming the palm fronds off of the tree.

It is also an important object of the present invention to provide a self-propelled palm tree climbing apparatus that has a maintenance section which detachably mounts to the base frame of the climbing section in a manner that allows use of interchangeable heads to perform different maintenance operations on the palm tree.

Another important object of the present invention is to provide a self-propelled palm tree climbing apparatus that comprises a climbing section that is configured to ascend and descend the trunk of a palm tree in its heightwise direction and in a manner that is effective and safe for performing one or more maintenance operations.

Another important object of the present invention is to provide a self-propelled palm tree climbing apparatus that is configured to provide a uniform and consistent maintenance operation, such as stripping the wrapping or trimming the fronds off of a palm tree, along the height of the trunk and from one tree to another.

Yet another important object of the present invention is to provide a self-propelled palm tree climbing apparatus that is configured to be utilized with a tent or tent-like device to direct cut materials generally downward to the ground below the tree to avoid injuring people or damaging property.

The above and other objectives of the present invention will be explained in greater detail by reference to the attached figures and the description of the preferred embodiment which follows. As set forth herein, the present invention resides in the novel features of form, construction, mode of operation and combination of processes presently described and understood by the claims.

BRIEF DESCRIPTION OF THE DRAWINGS

In the drawings which illustrate the preferred embodiments and the best modes presently contemplated for carrying out the present invention.

DETAILED DESCRIPTION OF THE PREFERRED EMBODIMENTS

With reference to the figures where like elements have been given like numerical designations to facilitate the reader's understanding of the present invention, the preferred embodiments of the present invention are set forth below. The enclosed figures and drawings are merely illustrative of a preferred embodiment and represents one of several different ways of configuring the present invention. Although specific components, materials, configurations and uses are illustrated, it should be understood that a number of variations to the components and to the configuration of those components described herein and in the accompanying figures can be made without changing the scope and function of the invention set forth herein. For instance, although the figures and description provided herein are primarily described as being utilized with a cutting head to cut wrapping and/or fronds from the palm tree, those skilled in the art will readily understand that this is merely for purposes of simplifying the present disclosure and that the present invention is not so limited, as the present invention is equally applicable for use with different head configurations that can perform different operations.

Figure 1:
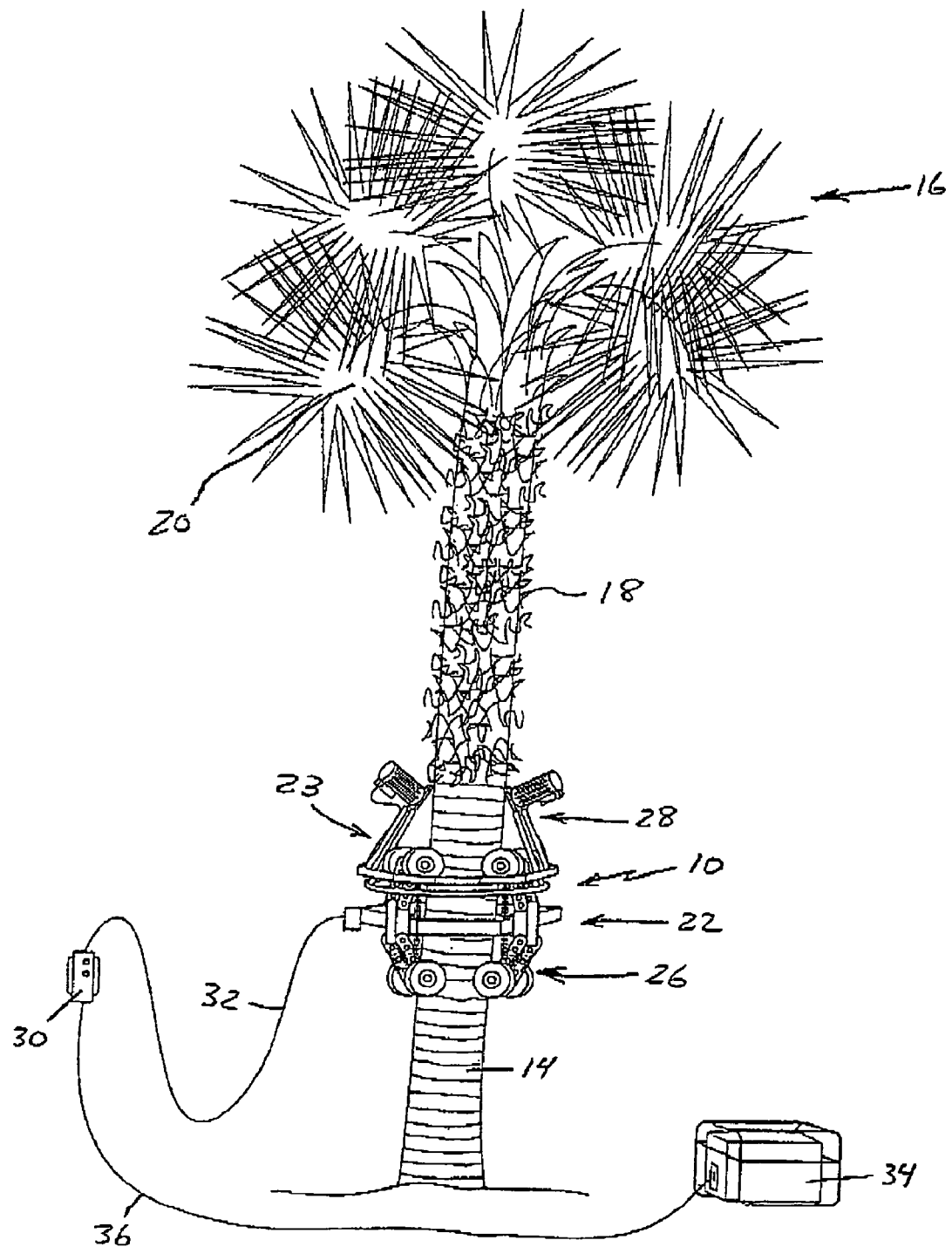
FIG. 1 is a side view of a self-propelled climbing apparatus configured according to a preferred embodiment of the present invention, with a cutting head comprising the maintenance section and with the tent support ring and tent removed, shown climbing a palm tree.
Figure 8:
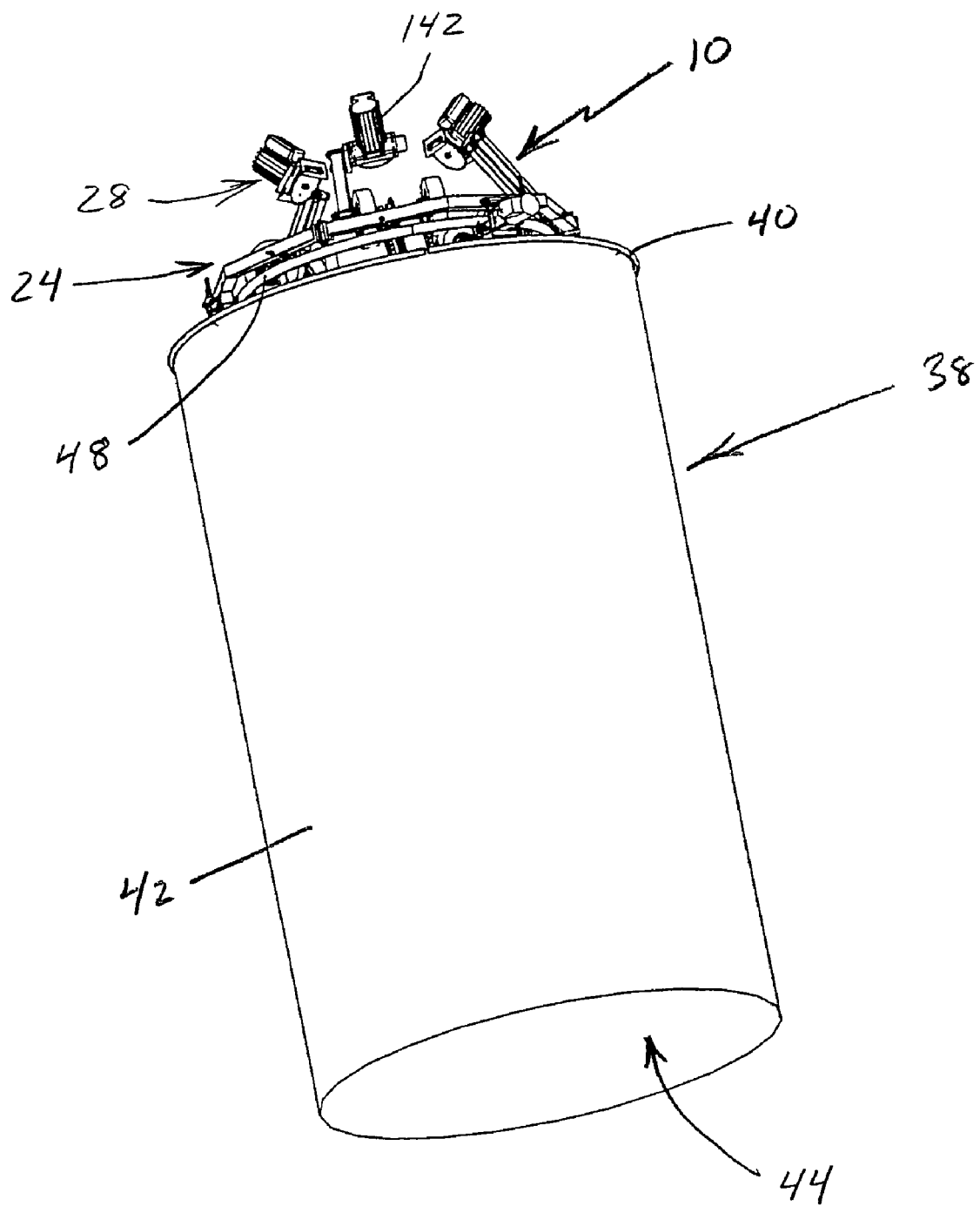
FIG. 8 is a bottom perspective view of the climbing apparatus of FIG. 2 shown with a protective tent attached thereto.

A self-propelled climbing apparatus that is manufactured out of the components and configured pursuant to a preferred embodiment of the present invention is shown generally as 10 in the figures. Climbing apparatus 10 is configured to be utilized to perform one or more maintenance operations on a palm tree 12 having a trunk 14 and a crown section 16, as shown in FIG. 1. One such maintenance operation is stripping palm wrappings 18 or trimming palm fronds 20 from the trunk 14 of palm tree 12. Climbing apparatus 10 generally comprises a climbing section 22 configured to engage and climb the trunk 14 and a maintenance section 23, which in the embodiment shown in the various figures comprises a cutting head 24, that is configured to perform the desired maintenance operation(s). As explained in more detail below, climbing section 22 comprises a plurality of climbing mechanisms 26 configured to move climbing section 22 up and down the trunk 14 of palm tree 12 and cutting head 24 comprises one or more cutting mechanisms 28 configured to remove the palm wrappings 18 and/or palm fronds 20 from trunk 14. As shown in FIG. 1, climbing apparatus 10 is controlled by the user through operation of hand control unit 30, which connects to climbing apparatus 10 by control cable 32 and to a source of electrical power, such as a portable generator 34, through power cable 36. As known to those skilled in the art, various other arrangements are possible to control climbing apparatus 10, such as the use of a wireless controller that utilizes radio or other signals to transmit the operator's instructions, and to provide electrical power to climbing apparatus 10, such as plugging power cable 36 into a private or municipal electrical outlet that connects to an electrical grid. In addition to the foregoing, the preferred embodiment of climbing apparatus 10 utilizes a tent assembly 38, comprising a tent support ring 40 and tent 42, as shown in FIG. 8 and set forth in more detail below, that define a debris chamber 44 to direct the stripped or trimmed materials down toward the ground around palm tree 12 to reduce the likelihood of people or property being harmed by use of climbing apparatus 10.

Figure 9:
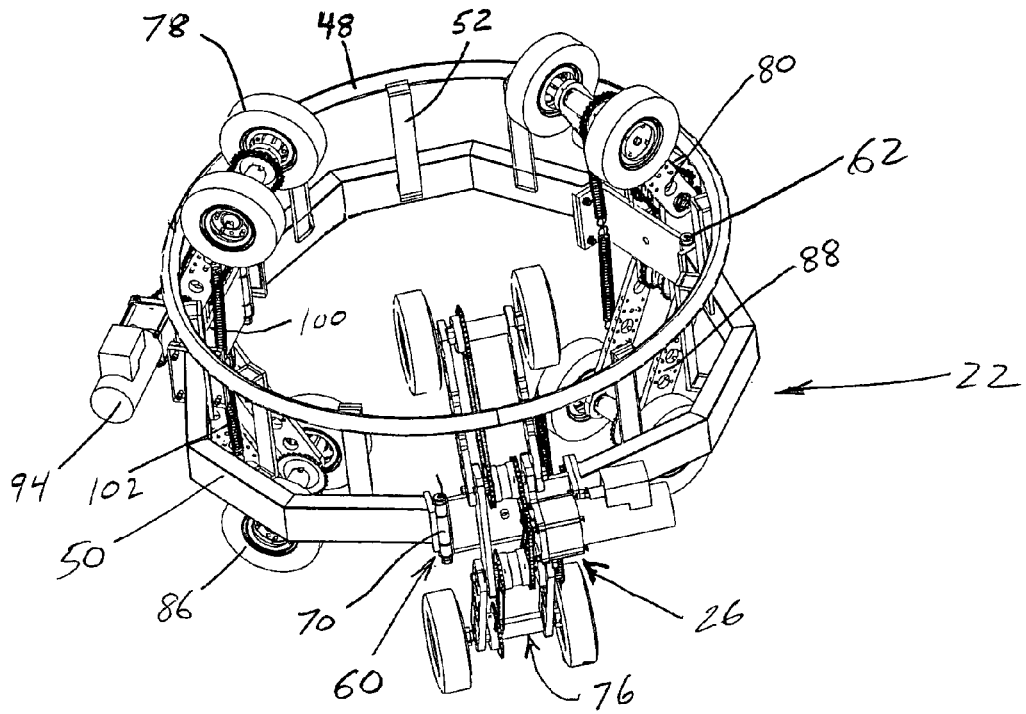
FIG. 9 is a top perspective view of the climbing apparatus of FIG. 2 shown with the cutting head removed.

The preferred embodiment of complete climbing apparatus 10 of the present invention, minus tent assembly 38, is best shown in FIGS. 2 through 7. As best shown in the top and bottom view of FIGS. 4 and 5, respectively, in use the climbing apparatus 10 defines an interior space 46 that is at least partially filled by trunk 14 of palm tree 12 during use. As stated above, climbing apparatus 10 primarily comprises climbing section 22 and cutting head 24, which is rotatably supported above climbing section 22 on head support rail 48 that is supported vertically above and in spaced apart relation to main support frame 50, which is part of climbing section 22, by a plurality of head support members 52, as best shown in FIG. 9. As shown in FIG. 9, head support members 52 interconnect main support frame 50 and head support rail 48 in a manner that provides a track for cutting head 24 to rotatably connect to and move around on, as explained in more detail below, head support rail 48 during use of climbing apparatus 10. In the preferred embodiment, head support rail 48 is a round tubular member that is configured substantially in a circular configuration for ease of cutting head 24 to move around and head support members 52 are disposed on the inside (as used herein, "inside" refers to the position in or relative to the interior space 46 where trunk 14 will be positioned and "outside" refers to the position outside of interior space 46) portion of head support rail 48 to provide an unobstructed path for head section 24. The connection of head support members 52 to head support rail 48 and main support frame 50 is fixed such that head support rail 48 remains in a set position above main support frame 50 during use of climbing apparatus 10. Depending on the materials, this can be achieved in a variety of different ways. For metals, the fixed attachment can be obtained by welding the top of head support members 52 to head support rail 48 and the bottom of head support members 52 to main support frame 50. Other materials may require another type of attachment mechanism. The materials and attachment mechanisms need to be chosen to take into account the weight of cutting head 24 and the vibration, torque and other forces that will result when cutting mechanism 28 removes wrapping 18 and/or fronds 20 from trunk 14.

Figure 2:
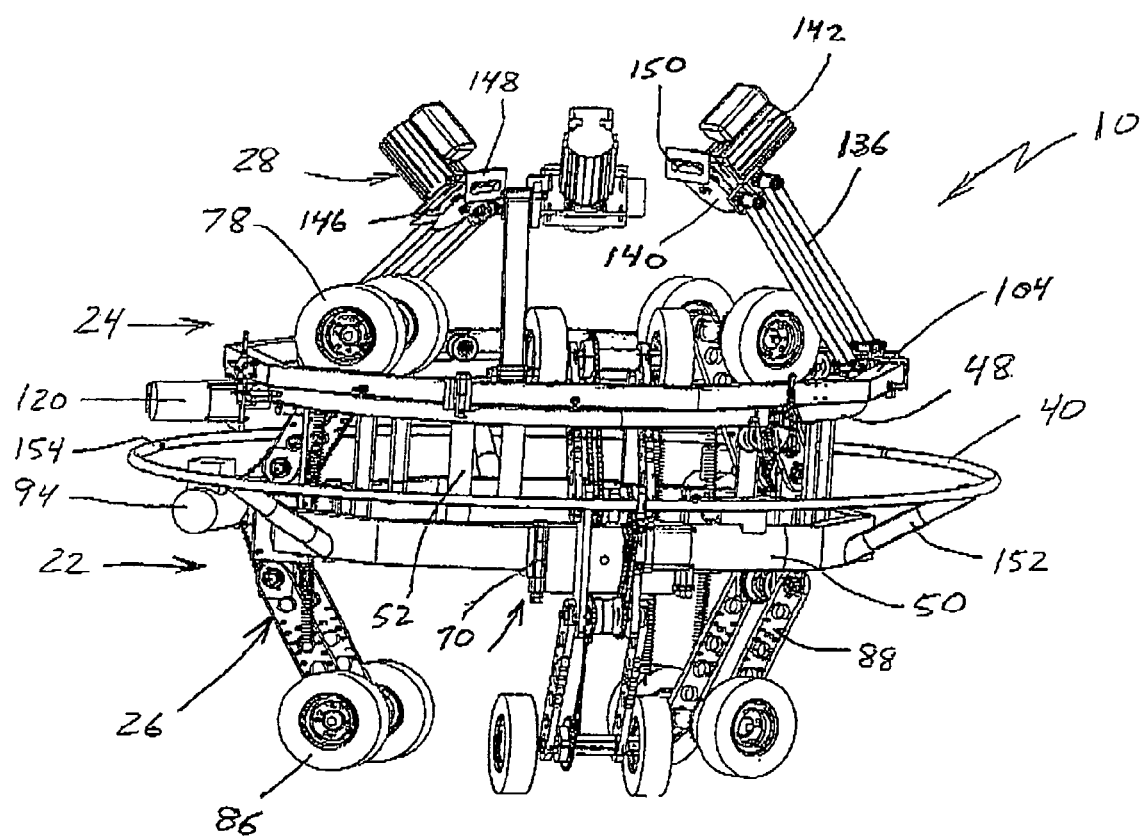
FIG. 2 is a side view of a self-propelled climbing apparatus configured according to a preferred embodiment of the present invention.
Figure 10:
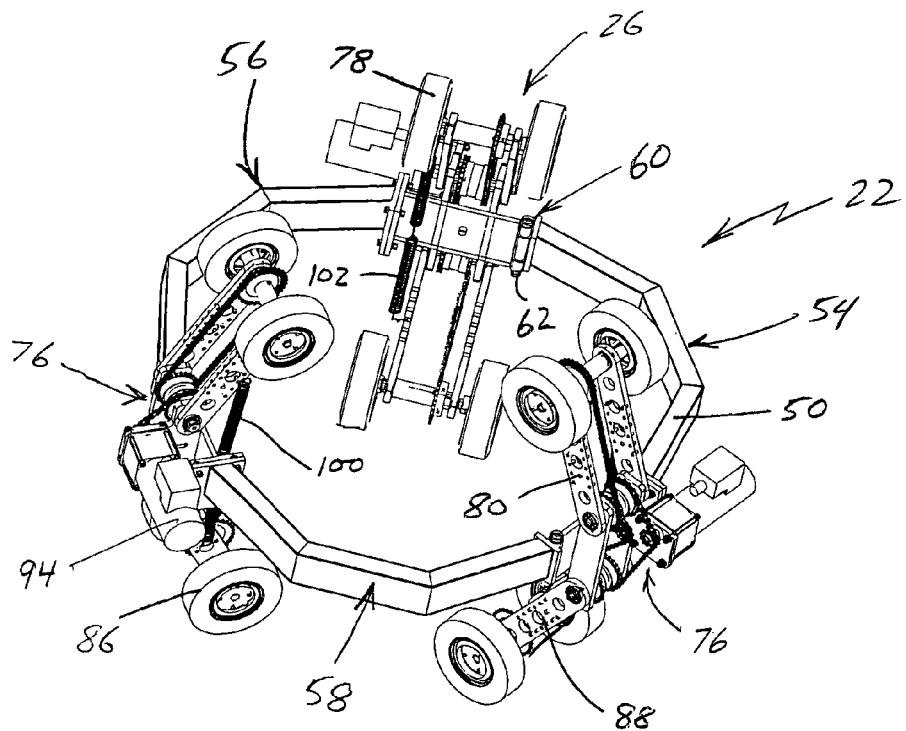
FIG. 10 is a top perspective view of the climbing apparatus of FIG. 9 shown with the head support rail and support members removed to better illustrate the climbing section and the three climbing mechanisms used therewith.
Figure 11:
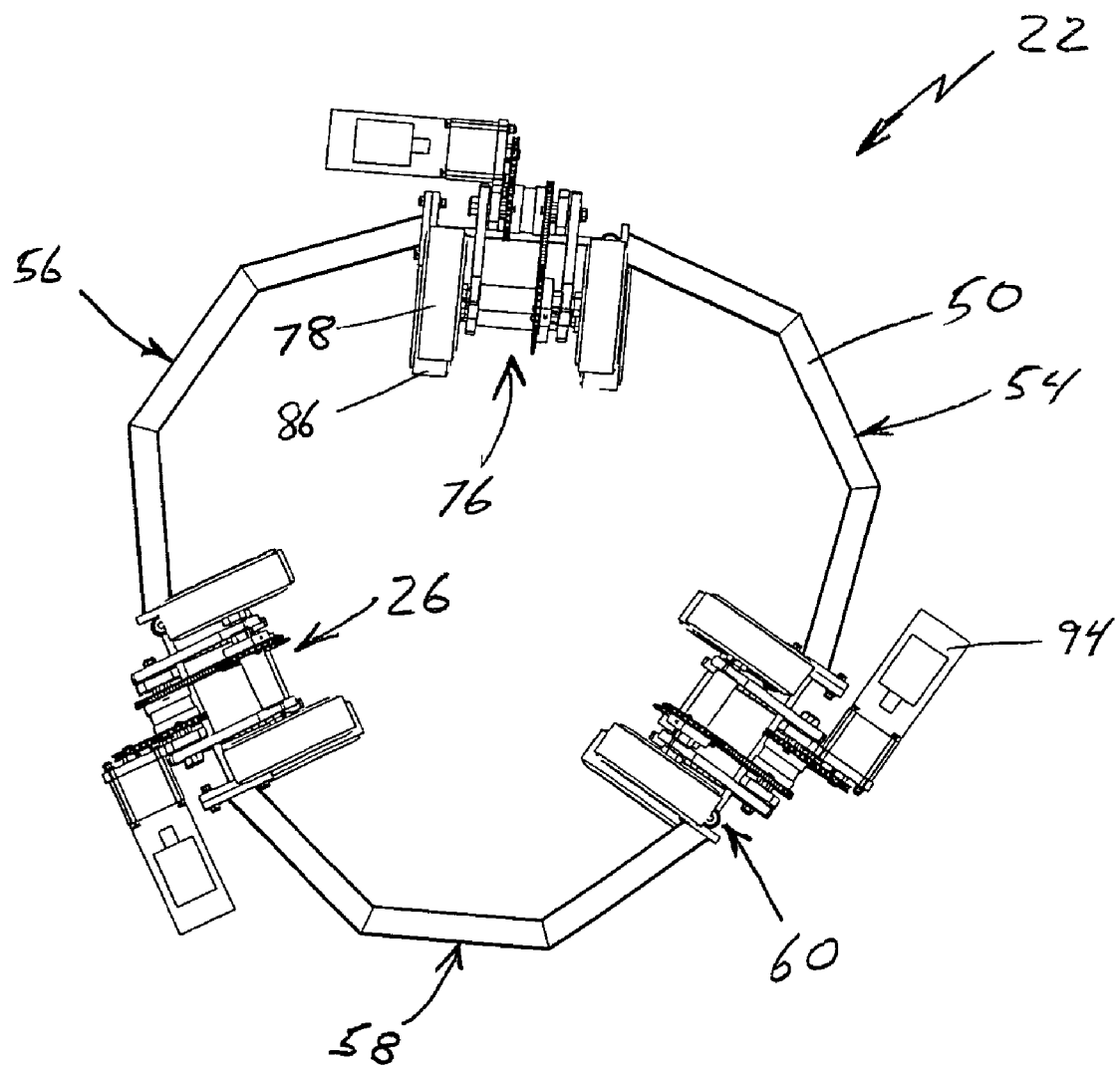
FIG. 11 is a top view of the climbing section of FIG. 10.
Figure 12:
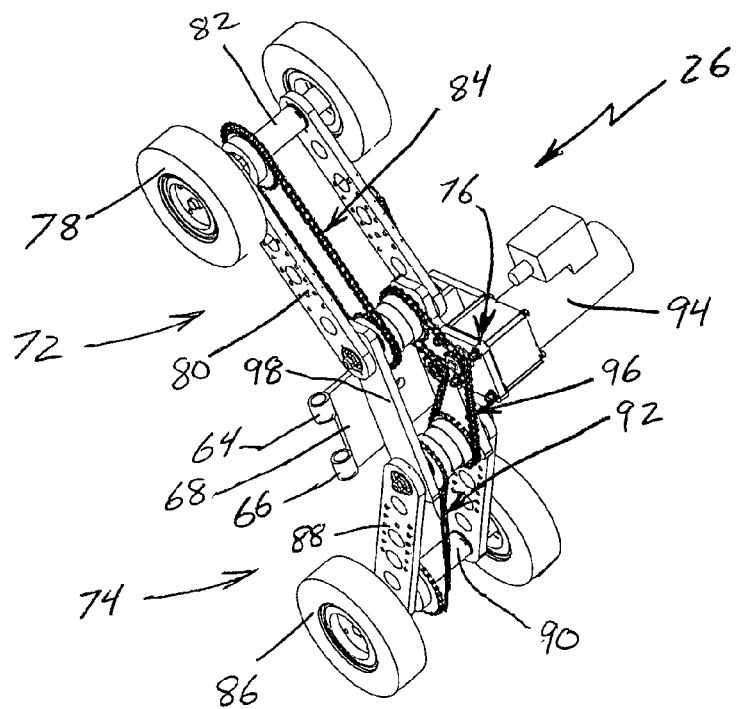
FIG. 12 is an outside perspective view, relative to the position of the tree trunk during use, of one of the three climbing mechanisms of FIG. 10 used with the climbing apparatus of the present invention.
Figure 13:
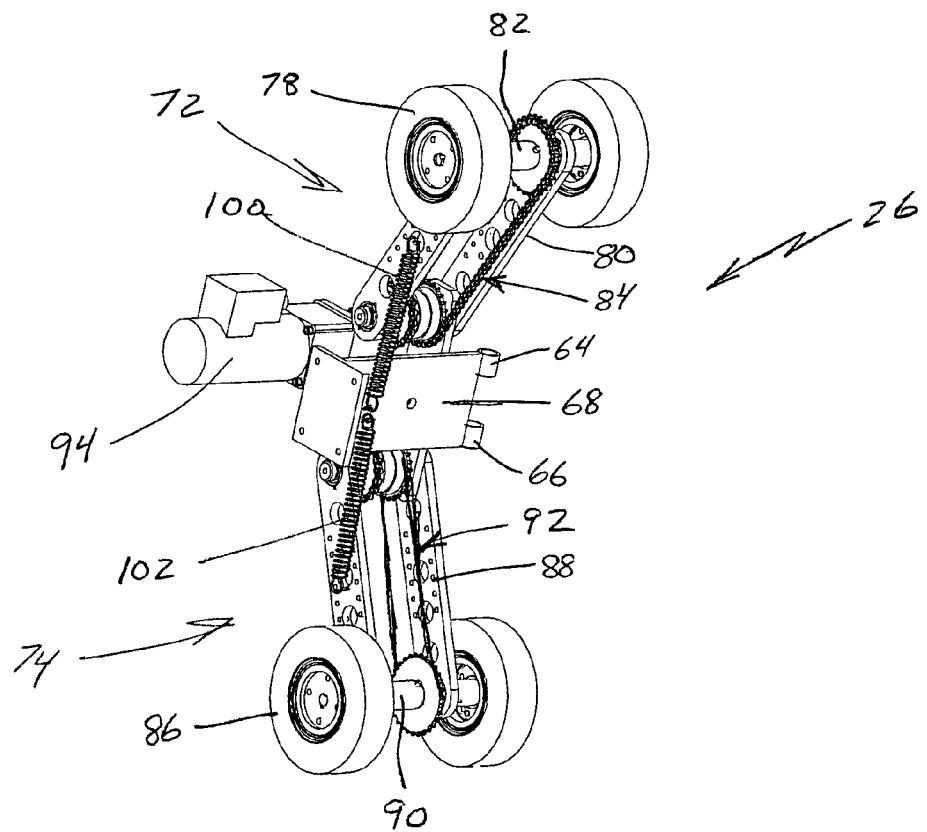
FIG. 13 is an inside perspective view of the climbing mechanism of FIG. 11.
Figure 14:
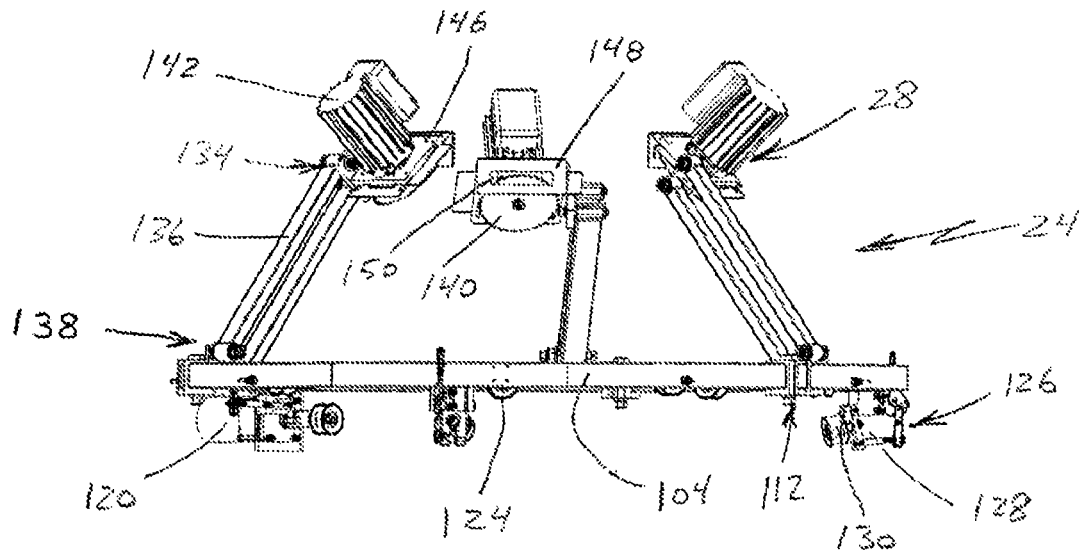
FIG. 14 is a side view of the cutting head used with the climbing apparatus of FIG. 2.
Figure 15:
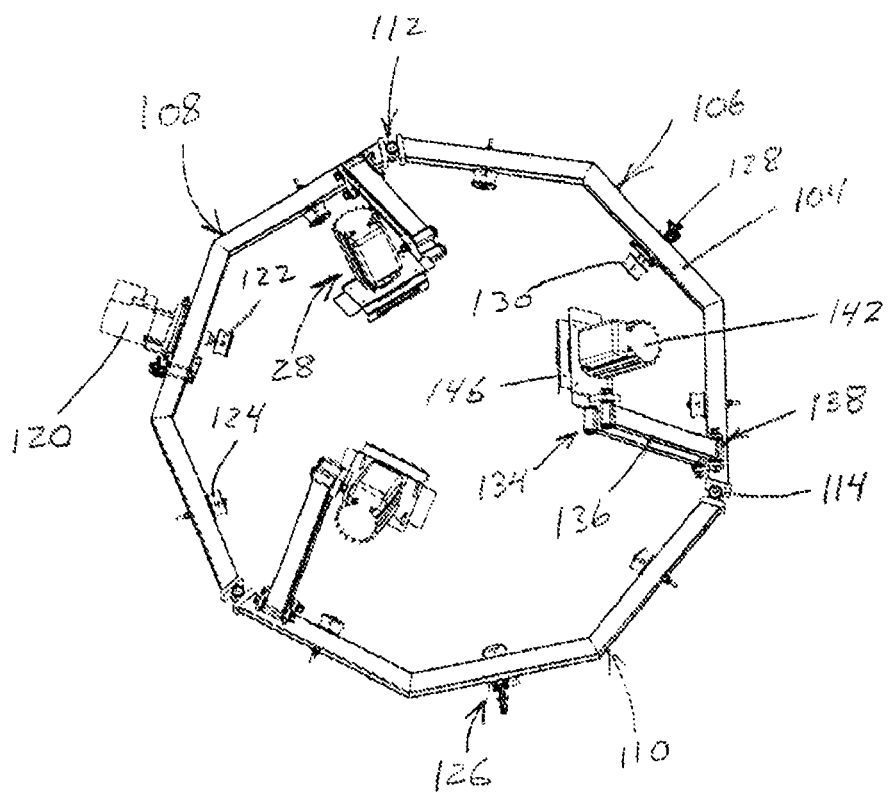
FIG. 15 is a top view of the cutting head of FIG. 14.
Figure 16:
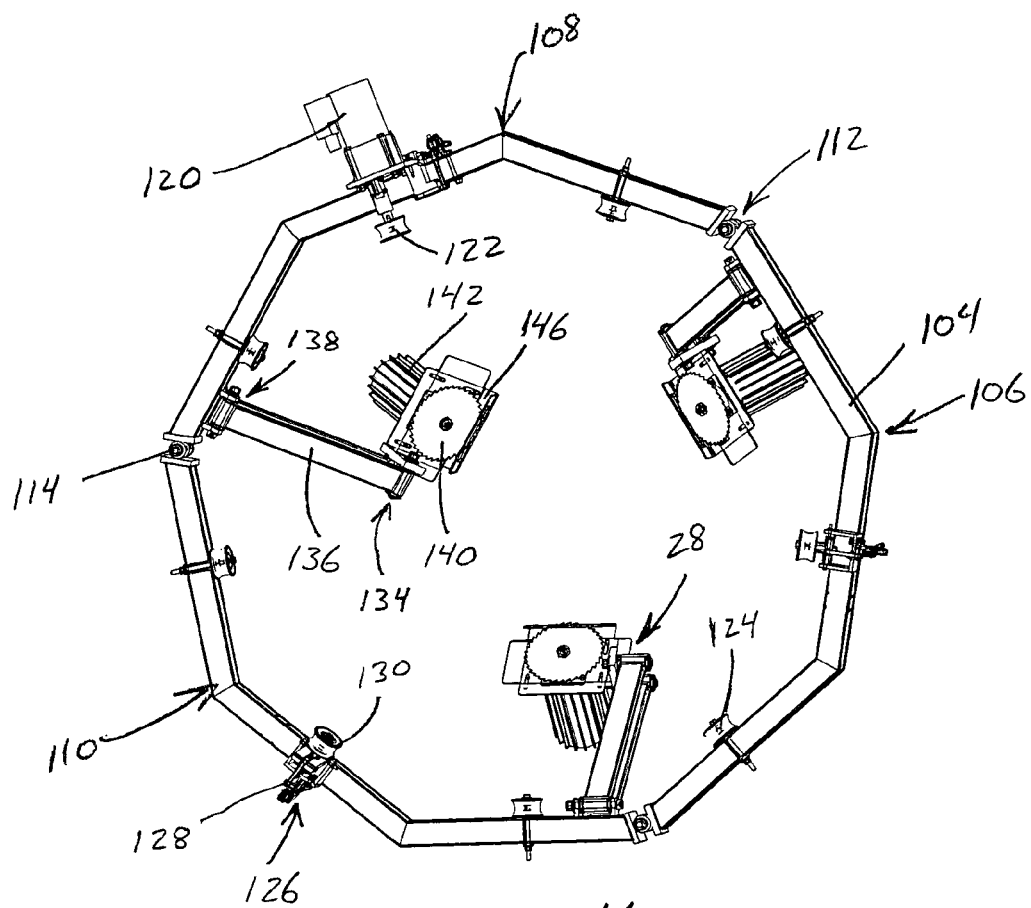
FIG. 16 is a bottom view of the cutting head of FIG. 14.

The complete climbing section is best shown in FIGS. 10 and 11. As shown therein, preferably main support frame 50 is configured in a generally open arrangement made up of two or more generally arcuate sections, such as first support section 54, second support section 56 and third support section 58, that are hinged together at support hinge 60 and secured together by support pin 62. Although three separate arcuate sections are shown, those skilled in the art will readily understand that the present invention will function with two or more than three separate sections. The hingedly connected support sections 54, 56 and 58 are configured to allow the operator to disengage support hinge 60, by removing support pin 62, to separate two adjoining support sections and allow access to interior space 46 so that climbing apparatus 10 may be placed around the trunk 14 of palm tree 12. In the embodiment shown in the figures, support hinge 60 comprises an upper hinge receptacle 64 and a lower hinge receptacle 66 mounted on mounting plate 68 at one end of each support sections 54, 56 and 58 of climbing mechanism 26, as best shown in FIGS. 12 and 13, and a center hinge receptacle 70 mounted on the opposite end of an adjoining support section 54, 56 and 58, as best shown in FIGS. 2 and 9 (which is similar to that shown as 116 and 118 for the section of cutting head 26 in FIGS. 17 and 18). With center hinge receptacle 70 disposed between upper 64 and lower 66 hinge receptacles and support pin 62 inserted therethrough, support hinge 60 will allow pivoting movement of one support section relative to another until all support sections, such as 54, 56 and 58, are connected, at which point no pivoting will be possible. As is well known to those who are skilled in the art, various other configurations are possible for support hinge 60 to accomplish the same objectives described herein with regard to separation and joining of the arcuate sections of main support frame 50.

As stated above and best shown in FIGS. 10 and 11, climbing section 22 supports two or more, preferably three, climbing mechanisms 26. In the preferred embodiment, the climbing mechanisms 26 are attached to main support frame 50, as shown in these figures, to define the substantially continuous enclosure for interior space 46 when each of the support hinges 60 have support pin 62 therein. Climbing mechanisms 26 are configured to engage and climb the trunk 14 of palm tree 12. As best shown in FIGS. 12 and 13, each of the climbing mechanisms 26 comprise an upper drive assembly 72 and a lower drive assembly 74, with a drive mechanism 76 configured to drive both upper 72 and lower 74 drive assemblies. Upper drive assembly 72 comprises one or more upper wheels 78, such as the pair shown, supported generally above and in spaced relation to main support frame 50 by one or more upper arms 80. The upper wheels 78 are rotatably connected to upper arm(s) 80 and driven by drive mechanism 76. In the embodiment shown in the figures, a pair of upper wheels 78 are utilized and are connected to a pair of upper arms 80 by upper axle 82, which is connected to drive mechanism 76 by upper chain/socket assembly 84 so as to rotate the one or more upper wheels 78 and engage the surface of trunk 14. Lower drive assembly 74 comprises one or more lower wheels 86, such as the pair shown in FIGS. 12 and 13, that are supported generally below and in spaced relation to main support frame 50 by one or more lower arms 88. Lower wheels 86 are rotatably connected to lower arm(s) 88 and driven by drive mechanism 76. In the embodiment shown in the figures, a pair of lower wheels 86 are utilized and are connected to a pair of lower arms 88 by lower axle 90, which is connected to drive mechanism 76 by lower chain/socket mechanism 92 so as to rotate the one or more lower wheels 86 and engage the surface of trunk 14. As a result of testing, the inventor believes that a single upper wheel 78 and a single lower wheel 86 may perform better due to being able to better adjust to the natural curvature of trunk 14. If two, or more, upper 78 and lower 86 wheels are utilized, it is likely best to utilize flexible upper 82 and lower 90 axles to allow the wheels 78 and 86 to flex in response to changes in the curvature of trunk 14. For the present invention, wheels 78 and 86 can be of the standard type, such as eight inch diameter rubber wheels, or they can be made out of a variety of alternative materials, including plastic and plexiglass, and be spiked or have other types of gripping/traction mechanisms for improving the engagement of wheels 78 and 86 on trunk 14.

In the preferred embodiment upper drive assembly 72 and lower drive assembly 74 are driven by drive mechanism 76 comprising an electric motor 94, such as a 200 Watt ⅓ horsepower motor, that connects to upper 72 and lower 74 drive assemblies by the center chain/socket assembly 96, best shown in FIG. 12, that drives both upper 72 and lower 74 drive assemblies in unison to move climbing apparatus 10 up the trunk 14 of tree 12. The ends of upper arm 80 and lower arm 88 opposite that of wheels 78 and 86 are pivotally attached to mounting plate 68, by way of support structure 98, which is also best shown in FIG. 12, to allow wheels 78 and 86 to spread apart from each other as climbing mechanism 26 engages trunk 14 to account for different sizes of trunk 14 and for changes in the diameter of trunk 14 as climbing apparatus 10 moves up the trunk 14 of tree 12. To maintain the engagement of wheels 78 and 86 against trunk 14, climbing mechanism 26 also includes at least one spring mechanism, such as the upper spring 100 and lower spring 102 best shown in FIG. 13, which each may comprise one or more springs. In the preferred embodiment shown in the figures, upper spring 100 interconnects upper arm 80 and support plate 68 and lower spring 102 interconnects lower arm 88 and support plate 68. Although it may be possible to operate climbing apparatus 10 with only one set of wheels, such as lower wheels 86 as biased by lower spring 102, against trunk 14, it is preferred that both springs 100 and 102 have sufficient biasing force to maintain engagement of upper 78 and lower 86 wheels against trunk 14 during the movement of climbing apparatus 10 up tree 12.

As stated above, in the embodiment shown in the figures maintenance section comprises cutting head 24 that is configured to strip palm wrapping 18 and trim palm fronds 20 off of the trunk 14 of palm tree 12. As best shown in FIGS. 14 through 18, cutting head 24 comprises a head support frame 104 that supports the cutting mechanism 28 and the mechanisms that configured to rotatably attach to head support rail 48, as shown in FIGS. 2 through 7. As with main support frame 50, head support frame 104 comprises two or more arcuate sections, such as first head section 106, second head section 108 and third head section 110, which are hinged together with head hinges 112 and secured by head pin 114 to form the configuration best shown in FIG. 15. As above, although three separate arcuate sections are shown for head support frame 104, those skilled in the art will readily understand that the present invention will function with two or more than three separate sections. The hingedly connected head sections 106, 108 and 110 are configured to allow the operator to disengage head hinge 112, by removing head pin 114, to separate two adjoining head sections and to the interior space 46 so that the cutting head 24 component of climbing apparatus 10 may be placed around the trunk 14 of palm tree 12. In the embodiment shown in the figures, head hinge 112 comprises an upper hinge receptacle 116 and a lower hinge receptacle 118 mounted on opposite ends of a head section, as best shown for first head section 106 in FIGS. 17 and 18. With upper hinge receptacle 116 disposed in abutting relation with lower hinge receptacle 118 and head pin 114 inserted therethrough, head hinge 112 will allow pivoting movement of one head section relative to another until all head sections, such as 106, 108 and 110, are connected, at which point pivoting will no longer be possible. As known to those skilled in the art, various other configurations are possible for head hinge 112 to accomplish the same objectives described herein with regard to separation and joining of the arcuate sections of head support frame 104.

Figure 17:
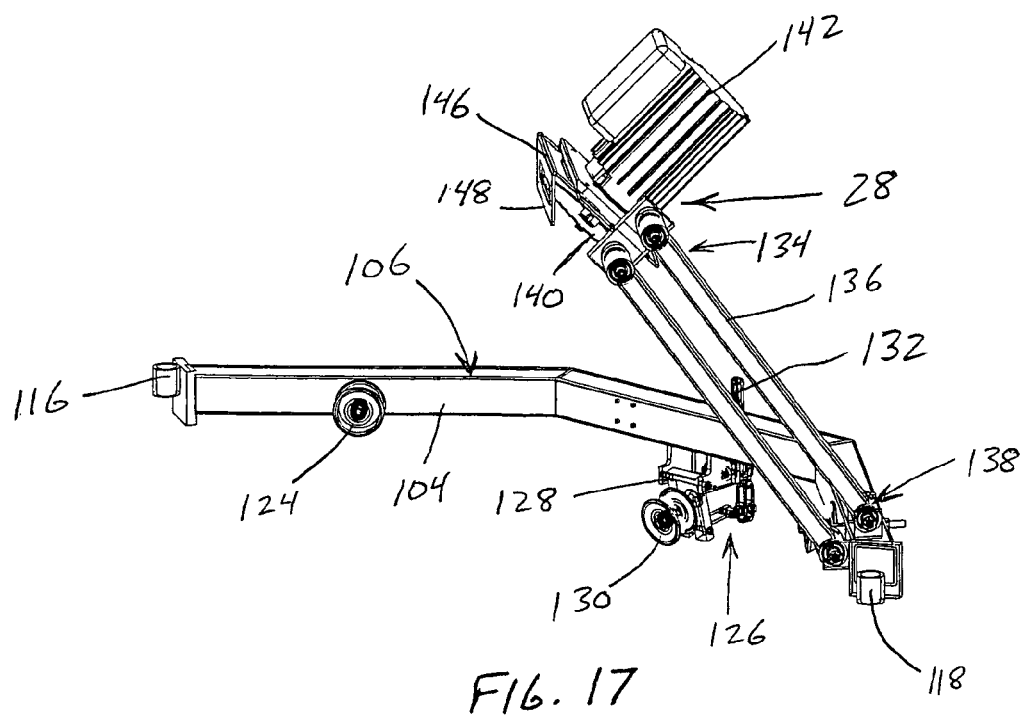
FIG. 17 is a partial side view of the cutting head of FIG. 14 illustrating the head support frame, clamping mechanism, cutting arm and cutting mechanism.
Figure 18:
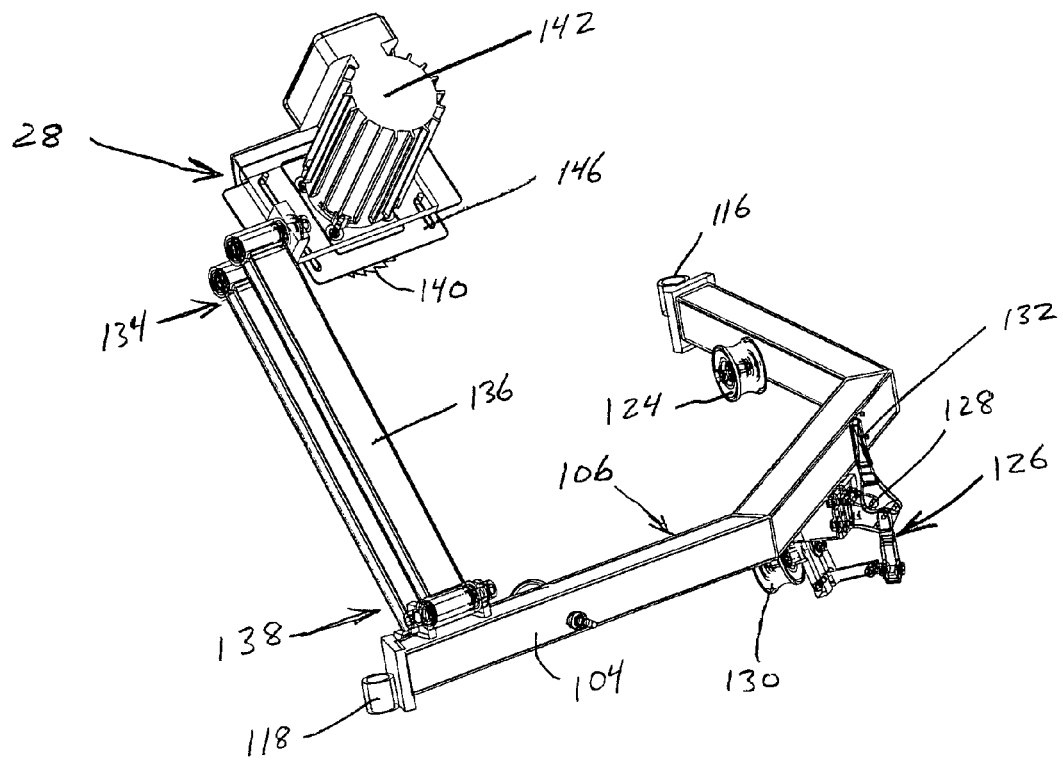
FIG. 18 is an outside view, looking towards the interior of the climbing apparatus, of the partial cutting head side view of FIG. 17.

In the preferred embodiment of the present invention, cutting head 24 is configured to rotate relative to climbing section 22 so as to allow cutting mechanism 28 to cut all around trunk 14. This is accomplished by rotatably connecting cutting head 24 to head support rail 48 that is supported above main support frame 50 by the head support members 52. To provide the desired rotation, cutting head 24 is provided with a rotating motor 120, such as a 200 Watt ⅓ horsepower electric motor, that is operatively connected to one or more drive rollers 122, best shown in FIGS. 15 and 16, that are configured to rotatably engage the top side of head support rail 48 and rotate cutting head 24 relative to climbing section 22. One or more upper rail rollers 124 are mounted on head support frame 104 and are configured to rotate against the top side of head support rail 48 as rotating motor 120 rotates drive roller 122. To maintain cutting head 24 on head support rail 48, and therefore connected to climbing apparatus 10, cutting head 24 is provided with one or more head clamping mechanisms 126, with a plurality being shown, that both clamp cutting head 24 to the head support rail 48 and allow cutting head 24 to rotate on head support rail 48. In the preferred embodiment shown, clamping mechanism 126 comprises a clamp 128 and a clamping roller 130, as best shown in FIGS. 17 and 18. Each of the clamping rollers 130 are positioned to ride under head support rail 48 such that head support rail 48 is rotatably engaged between upper rail rollers 124 on the top side and clamping rollers 130 on the lower side thereof. In the embodiment shown, each of the clamps 128 comprises a handle 132 that the user operates to engage or disengage the clamping roller 130 associated with the particular clamp 128, as best shown in FIGS. 17 and 18. When cutting head 24 is placed on head support rail 48, with drive roller 122 and upper rail rollers 124 resting on the top side of head support rail 48, clamps 128 are initially in their disengaged, open position. Once rollers 122 and 124 of cutting head 24 are placed on head support rail 48 and supported thereby, the user operates handle 132 of clamp 128 to cause the clamping roller 130 to move into its engaged position in abutting relation with the underside of head support rail 48, thereby effectively engaging head support rail 48 between rollers 122 and 124 on the top side and clamping rollers 130 on the bottom side in a manner that allows each of rollers 122, 124 and 130 to rotate relative to head support rail 48.

Cutting mechanism 28 is positioned at the upper end 134 of cutting support arm 136 that is attached at its lower end 138 to head support frame 104 as best shown in FIGS. 17 and 18. In the preferred embodiment, as shown in the figures, cutting mechanism 28 is pivotally attached to upper end 134 of cutting support arm 136 and the lower end 138 of cutting support arm 136 is pivotally attached to head support frame 104 to allow the pivoting of cutting mechanism 28 relative to cutting support arm 136 and separate pivoting of cutting support arm 136 relative to head support frame 104, and by its rotatable connection to head support rail 48, relative to climbing section 22. Cutting support arm 136 can have a variety of different configurations, including the dual frame configuration shown and/or be telescoping to extend cutting mechanism 28 to its desired position.

Figure 19:
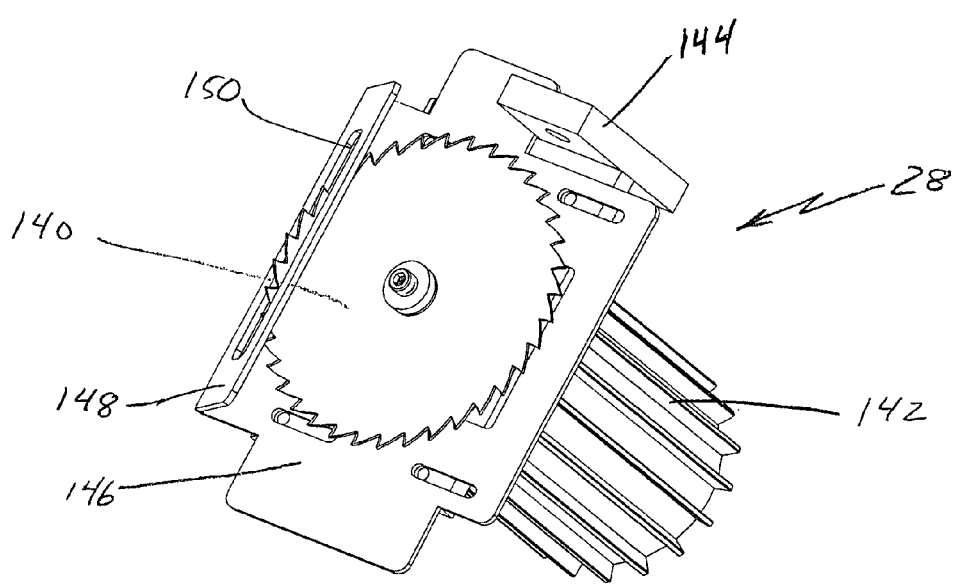
FIG. 19 is an isolated perspective view of the cutting mechanism utilized with the cutting head of the climbing apparatus of FIG. 2.

In the preferred embodiment, best shown in FIG. 19, cutting mechanism 28 comprises a saw blade 140, such as a six inch diameter blade, operatively connected to an electric motor 142, such as a 0.2 horsepower motor, to rotate the saw blade 140 at high speed to strip wrapping 18 and/or trim fronds 20 from trunk 14. Cutting mechanism 28 pivotally attaches to the upper end 134 of cutting support arm 136 by way of mounting block 144. A blade guard 146 separates saw blade 140 from motor 142. Preferably, blade guard 146 is provided with an outwardly extending trunk face member 148, with a blade slot 150 therein, that abuts the trunk 14 of palm tree 12 during use of climbing apparatus 10. A portion of saw blade 140 extends through blade slot 150 to cut the wrapping 28 and fronds 20 from trunk 14 without cutting into the trunk 14 of tree 12 itself.

Figure 4:
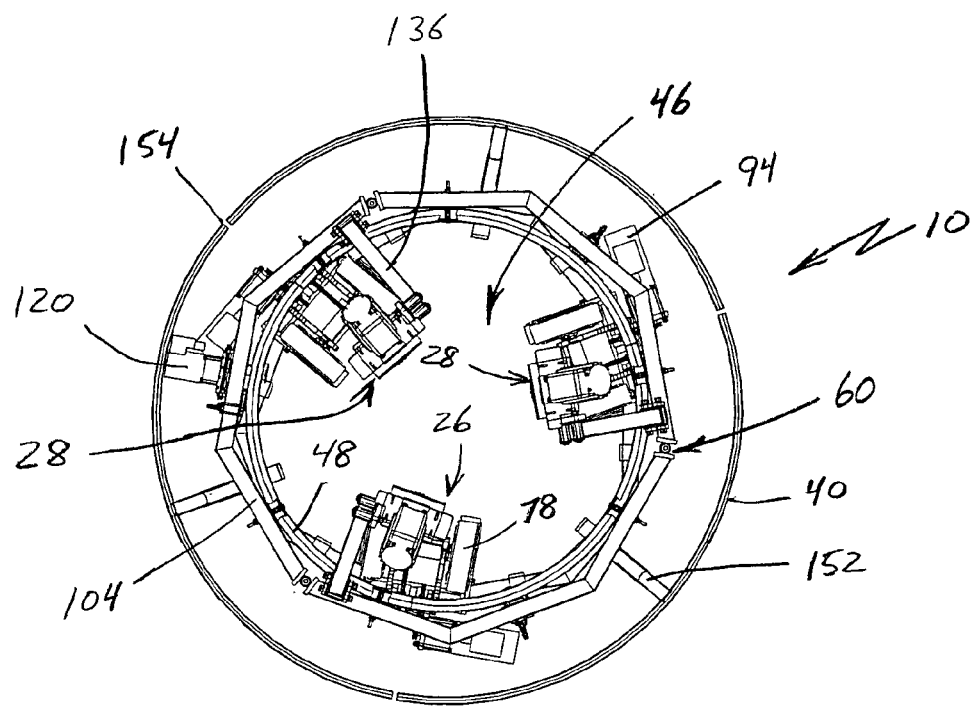
FIG. 4 is a top plan view of the climbing apparatus of FIG. 2.
Figure 5:
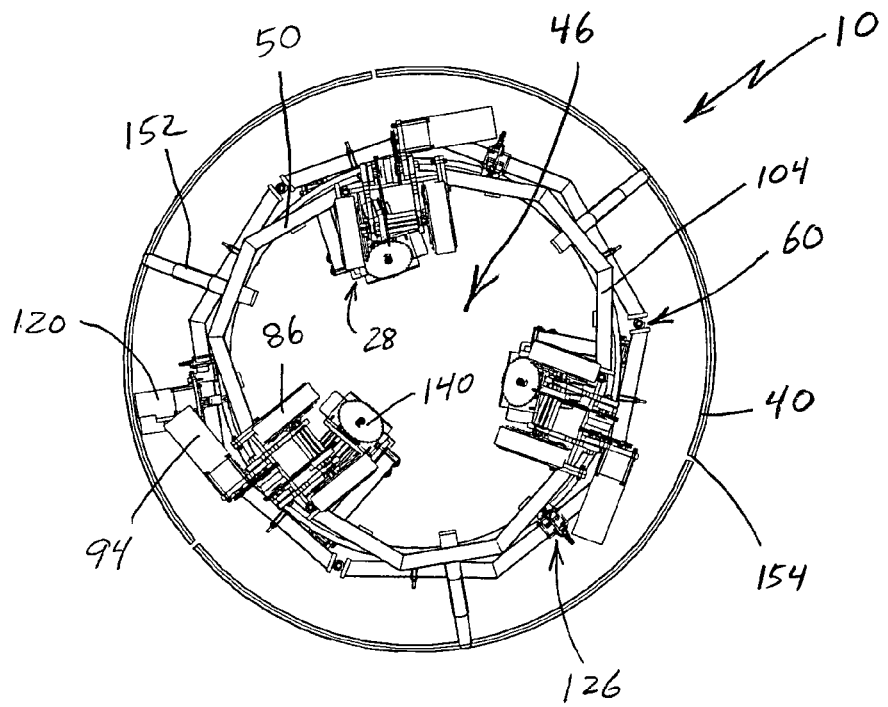
FIG. 5 is a bottom plan view of the climbing apparatus of FIG. 2.
Figure 6:
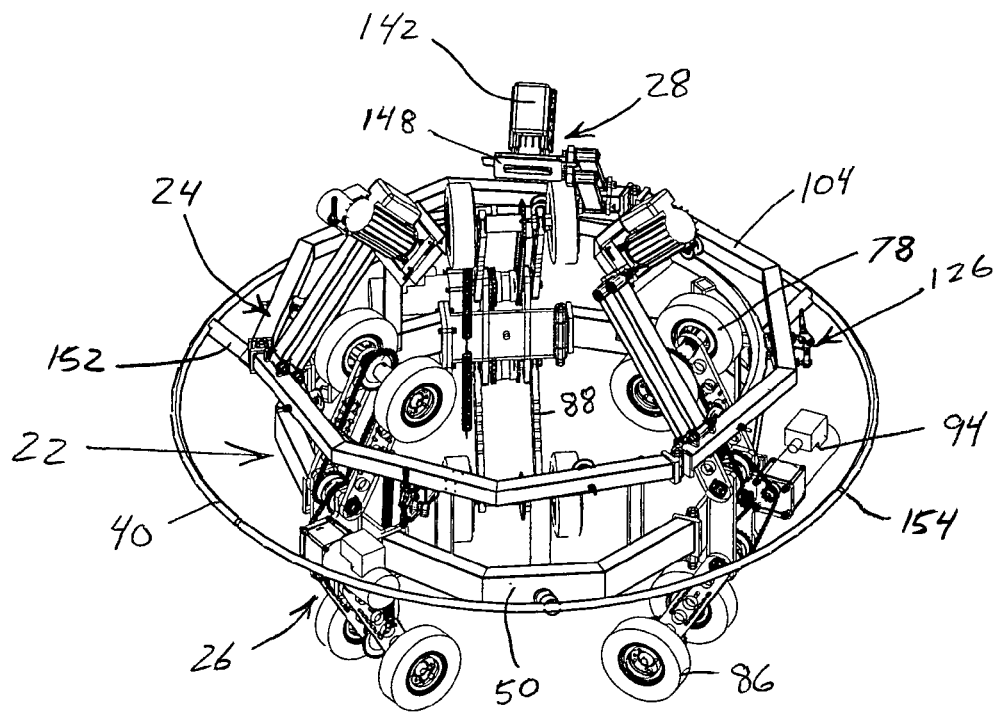
FIG. 6 is a top perspective view of the climbing apparatus of FIG. 2.
Figure 7:
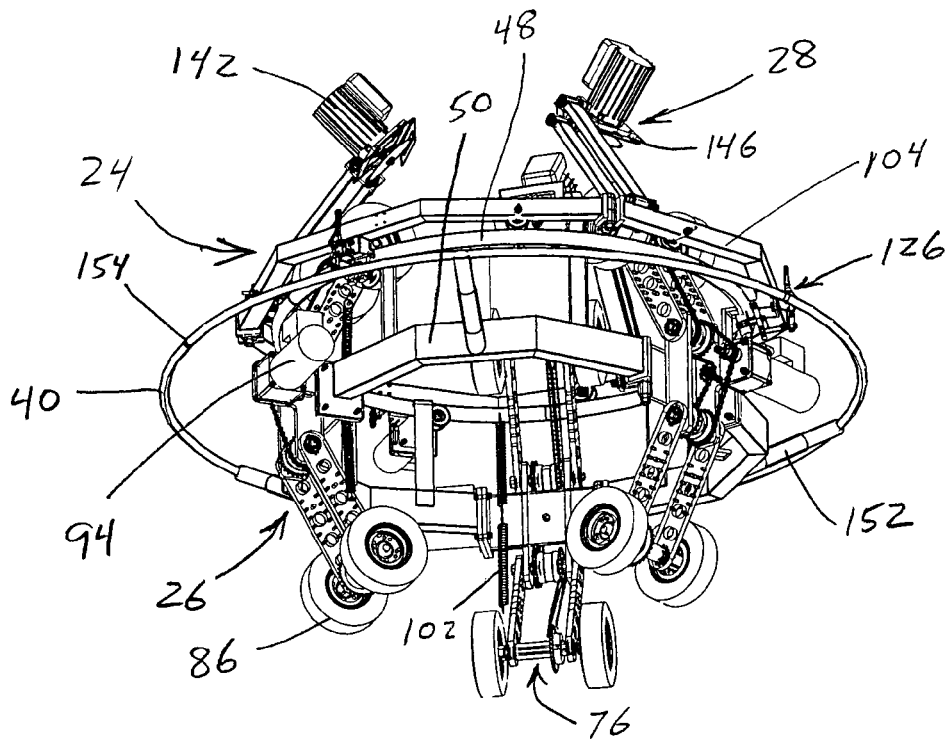
FIG. 7 is a bottom perspective view of the climbing apparatus of FIG. 2.
Figure 20:
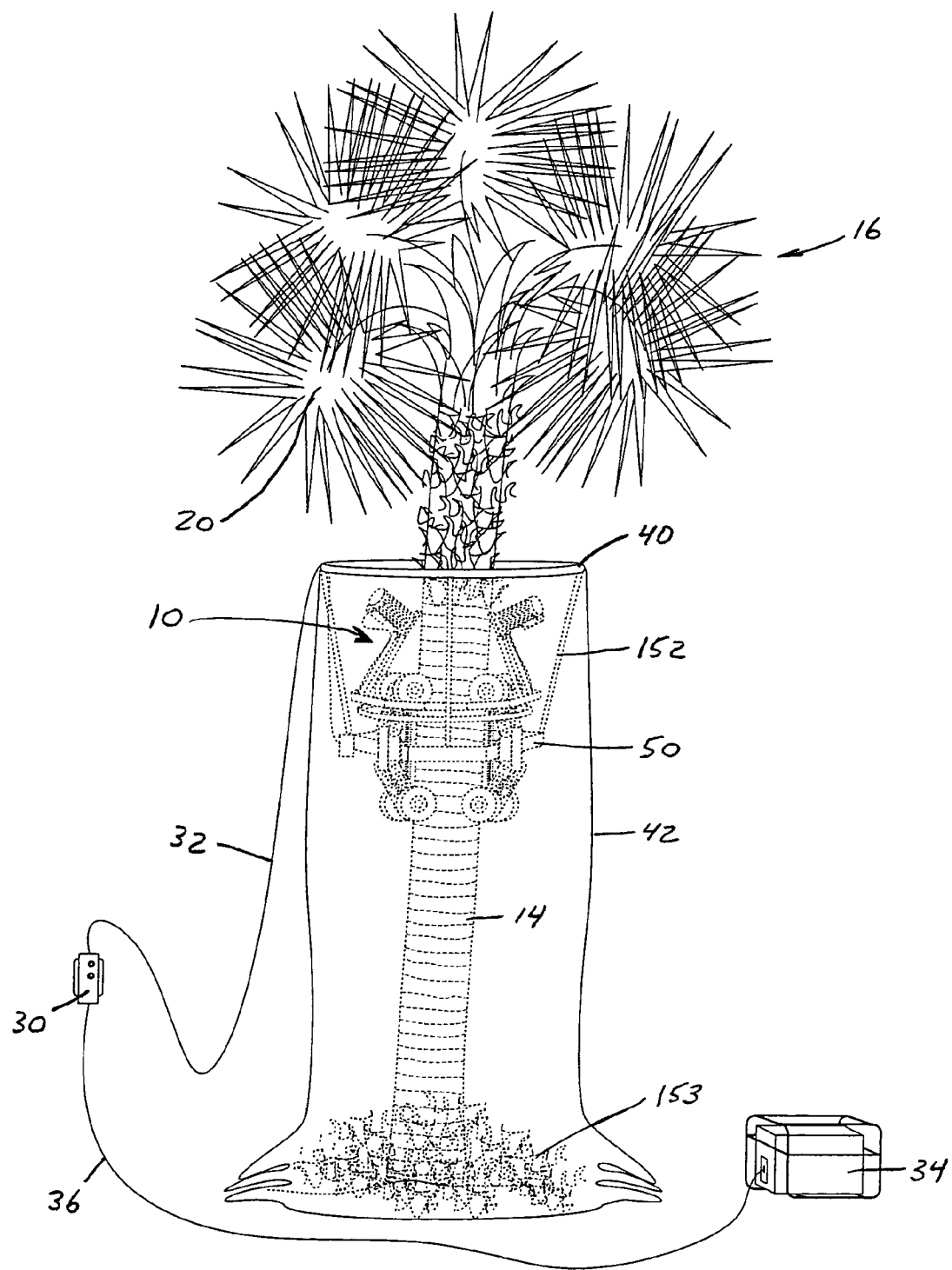
FIG. 20 is a side view of a preferred embodiment of a tent and tent support assembly shown in use on a palm tree with a self-propelled climbing apparatus configured according to a preferred embodiment of the present invention.

As stated above, the preferred embodiment of the climbing apparatus 10 of the present invention utilizes a tent assembly 38 comprising a tent 42 attached to tent support ring 40, as shown in FIGS. 8 and 20, to direct materials cut from palm tree 12 downward to the ground below palm tree 12 so as to reduce or eliminate workers or pedestrians being injured or property being damaged by the falling debris and to ease cleanup of the debris from the cutting operations. Tent support ring 40 is attached to climbing apparatus 10 by one or more ring support members 152 that attach to climbing apparatus 10 to place tent support ring 40 in spaced apart relation thereto, as best shown in FIGS. 2 through 7 and 20. In the preferred embodiment, shown in FIG. 20, ring support members 152 attach to main support frame 50 and are angled outwardly and upwardly to dispose tent support ring 40 outward of and above cutting head 24 of climbing apparatus 10. The debris, which is shown as 153 in FIG. 20, will be able to fall through the space between the outer periphery of climbing apparatus 10 and tent support ring 40 to fall downward to the ground through debris chamber 44. In the preferred use of the present invention, one or more tarps will be placed around the bottom of the palm tree 12 below the debris chamber 44 to further ease in cleanup of debris 153 from the cutting operations. Preferably, tent support ring 40 and ring support members 152 are sufficiently strong to force palm fronds 20 upward as climbing apparatus 10 moves upward such that when they are cut by saw blades 140 the fronds will fall with the branch portion aimed downward and the fan portion aimed upward. As known to those skilled in the art, the branch portion of fronds 20 have sharp teeth-like, serrated edges that are angled upward towards the fan portion of the frond 20. By directing the branch portion of the fronds 20 downward, this will reduce the likelihood that the teeth will get stuck on climbing apparatus 10 and be caught in and potentially damage tent 42. In a preferred embodiment, tent 42 is made from a flexible material, such as cloth or plastic, that is of sufficient durability to not easily tear or otherwise be damaged by the falling debris. As best shown in FIGS. 4 and 5, tent support ring 40 includes one or more split sections 154, such as the three shown, that divide tent support ring 40 into different sections so as to allow climbing apparatus 10 to be placed around the trunk 14 of a palm tree 12, as described above with regard to head support rail 48, main support frame 50 and head support frame 104. In the preferred embodiment, tent support ring 40 has a sufficient number of split sections 154 to divide tent support ring 40 into the same number of sections as the above components (i.e., main support frame 50 and head support rail 48).

Figure 3:
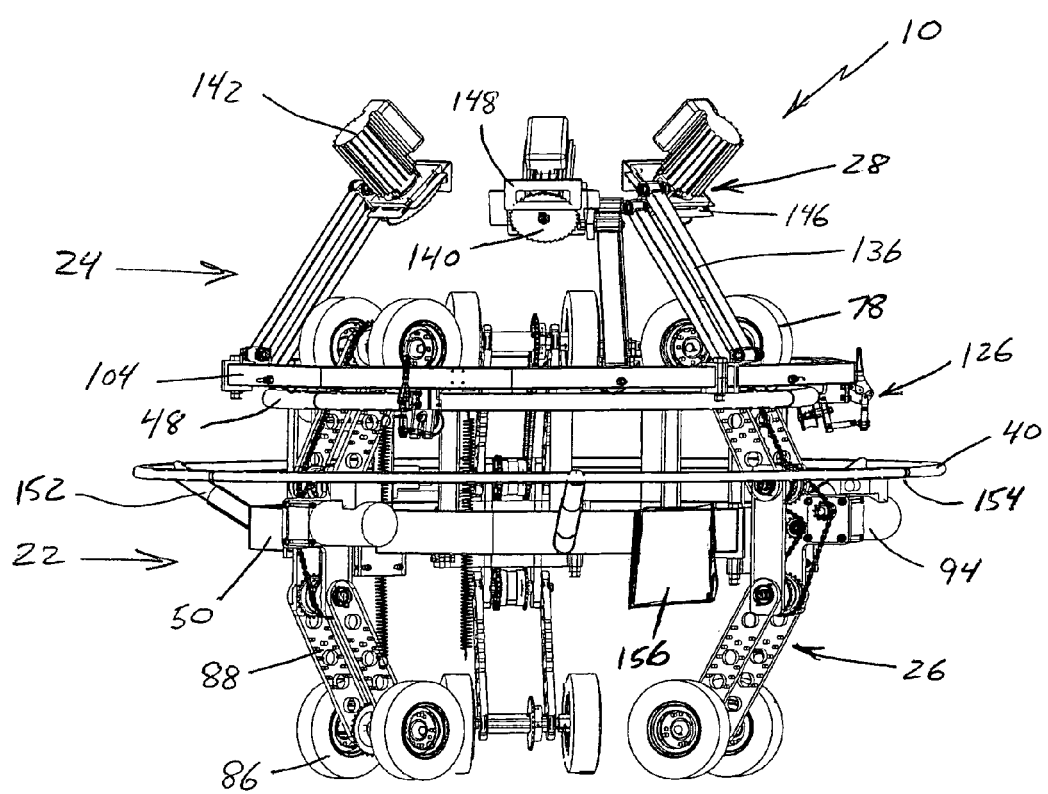
FIG. 3 is another side view of the climbing apparatus of FIG. 2 shown at a slightly different angle.

The preferred embodiment of the climbing apparatus 10 of the present invention also includes a control unit 156, shown in FIG. 3, mounted directly on climbing apparatus 10. In the preferred embodiment, control unit 156 is mounted securely onto main support frame 50 and is connected to hand control unit 30 by control cable 32. As stated above, in an alternative embodiment hand control unit 30 connects wirelessly to control unit 156. Control unit 156 contains a variety of electronic circuit boards and logic circuits for controlling the operations of climbing apparatus 10. For instance, control unit 156 controls the electric motor 94 of climbing mechanism 26 to control the direction (i.e., up or down) and speed thereof to control the movement of climbing mechanism 10 as it moves up trunk 14. Control unit 156 can also be configured to control the rotation of cutting head 24 on head support rail 48 and/or the rotational speed of saw blade 140. In addition, control unit 156 can be configured to control the pivoting upward or downward movement of cutting arms 136 to so as to position cutting mechanism 28 in the desired location relative to trunk 14. If desired, control unit 156 can also control a separate power mechanism, such as a hydraulic system, that is configured to expand or retract climbing mechanism 26 so as to spread apart or pull together upper wheels 78 and lower wheels 86.

Figure 21:
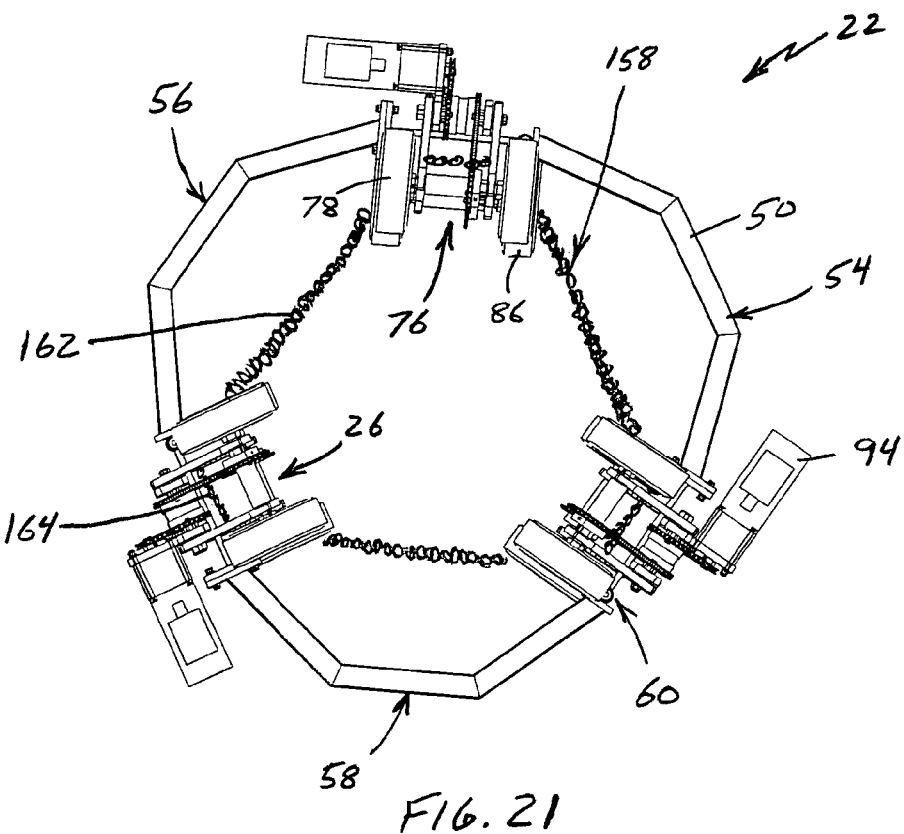
FIG. 21 is a top view of an alternative embodiment of the climbing apparatus showing the use of lateral biasing members to interconnect the climbing mechanisms and the climbing mechanism arms.
Figure 22:
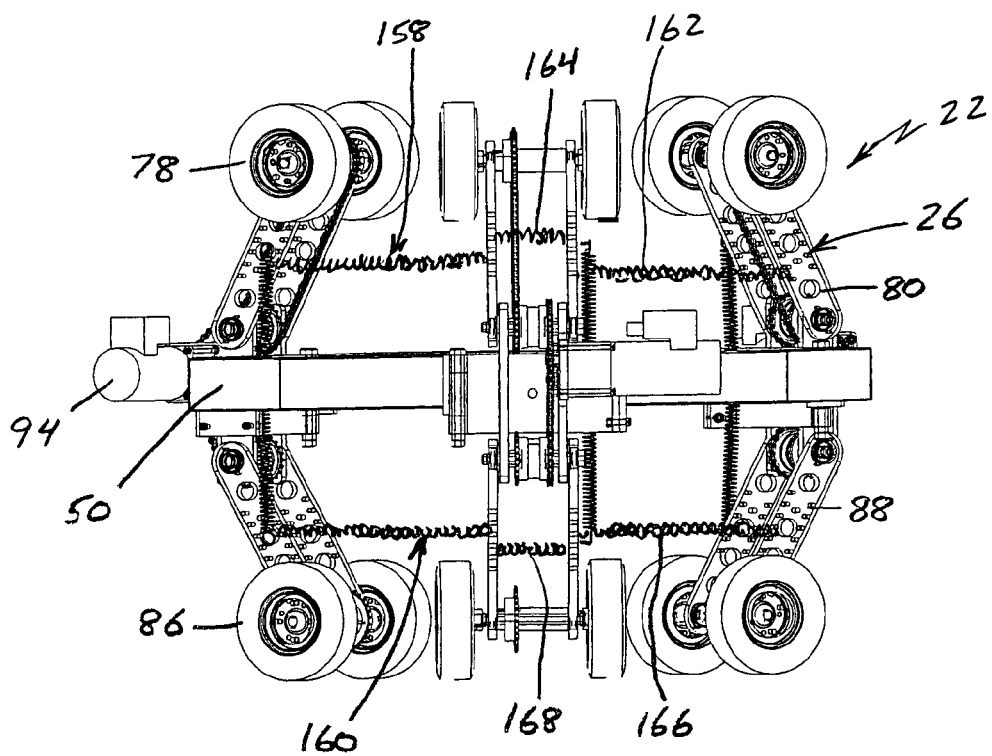
FIG. 22 is a side view of the alternative embodiment of the climbing apparatus shown in FIG. 21.

In an alternative embodiment, which may be preferred under certain circumstances, climbing section 22 of climbing apparatus 10 includes a plurality of upper lateral biasing devices 158 and a plurality of lower lateral biasing devices 160 that interconnect adjacent climbing mechanisms 26 and the pair of upper arms 80 together and the pair of lower arms 88 together, as shown in FIGS. 21 and 22. The purpose of upper 158 and lower 160 lateral biasing devices is to bias the climbing mechanisms 26 toward each other so as to better facilitate them moving up the trunk 14 of palm tree 12 as a collective unit, thereby maintaining climbing section 22 more level and in better operative contact with trunk 14. In the preferred configuration, upper lateral biasing devices 158 include three mechanism biasing devices 162 that connect the upper portion of adjacent climbing mechanisms 26 to each other so as to substantially force climbing mechanisms 26 to move in unison and three arm biasing devices 164 that connect the upper arms 80 of each climbing mechanism 26 together to prevent twisting of the arms 80 and maintain improved contact with trunk 14. The lower lateral biasing devices 160 of the preferred configuration also includes three mechanism biasing devices 166 that connect the lower portion of adjacent climbing mechanisms 26 to each other to assist in forcing climbing mechanisms 26 to move in unison and three arm biasing devices 168 that connect the lower arms 88 of each climbing mechanism 26 together to prevent twisting of the arms 88 and maintain improved contact with trunk 14. In a preferred embodiment, upper 158 and lower 160 biasing devices are springs having sufficient biasing force to achieve the objectives described herein. Alternatively, upper 158 and lower 160 biasing devices can be shock absorbers or similar devices suitable for biasing climbing mechanisms 26 and/or arms 80/88 together.

As described above, climbing apparatus 10 of the present invention is configured for use with different heads in maintenance section 23 (which is the cutting head 24 in the figures). Instead of placing cutting head 24 on head support rail 48, a variety of alternative heads can be utilized with the climbing section 22 described herein. For instance, instead of cutting head 24 as the maintenance section 23, climbing apparatus 10 can utilize a sprayer system that is configured to cover trunk 14 with a protective coating. The sprayer head would attach to head support rail 48 in the manner described above so that it may rotate relative to climbing section 22. As climbing apparatus 10 moves up and/or down trunk 14, the sprayer head would be configured to rotate around trunk 14 while spraying the protective coating. In this same manner, a decorative spray head can be utilized to move up and around trunk 14 to spray a logo, picture, written message or a wide variety of different designs on trunk 14. The decorative spray head would be configured similar to a dot matrix printer or other ink spraying devices that are computer controlled to spray the components of the design at the proper position on trunk 14 to achieve the final design. Likewise, a wrap/cable spray head can be provided to wrap the trunk 14 of palm tree 12 with a decorative material (i.e., red and white banners to achieve a candycane-like effect) and/or with a string of decorative lights. As with the cutting head, the above alternative heads reduce the need for a person to be raised to a sufficient height to spray coatings or wrap the trunk with a decorative material.

In use, climbing apparatus 10 is taken to the palm tree 12 where its use to perform a maintenance operation is desired, generally with the climbing section 22 separated from the maintenance section 23. Initially, a section of the trunk 14 near the bottom is cleared of wrapping 18 or other tree material for installation and positioning of climbing apparatus 10 thereon. At the tree 12, the user removes the support pin 62 from one or more support hinges 60 that connect first 54, second 56 and third 58 support sections of main support frame 50 to enable the user to pivot the adjoining support section to open into interior space 46. The open climbing section 22 is then placed around trunk 14, the subject section(s) are pivoted closed and support pin 62 is reinserted into the support hinge

60. During the operation of placing climbing section 22 around trunk 14, the upper wheels 78 of climbing mechanism 28 are spread apart from the lower wheels 86 thereof so that the wheels 78 and 86 are placed against trunk 14. With main support frame 50 closed around trunk 14, the biasing force of springs 100 and 102 will be sufficient to hold climbing mechanism 28 in place on trunk 14. If necessary, a pry bar or other mechanism may be necessary to provide the initial separation force to overcome the biasing force of springs 100 and 102. In an alternative embodiment, a separate power mechanism can be provided to separate upper 78 and lower 86 wheels. With climbing section 22 in place around trunk 14, cutting head 24 is placed on head support rail by first spreading apart one or more head sections 106, 108 and/or 110 of head support frame 104 by removing head pin 114 from one or more head hinges 112. Head support frame 104 is placed around trunk 14 and then closed by reinserting head pin 114 into the appropriate head hinge(s) 112. Drive roller 122 and upper rail rollers 124 are then placed on the top side of head support rail 48. Cutting head 24 is then detachably mounted to head support rail 48 by operating handle 132 to close clamp 128 and direct clamping rollers 130 against the bottom side of head support rail 48 to rotatably engage head support rail 48 between the sets of rollers 124 and 130. With both climbing section 22 and cutting head 24 installed around trunk 14, the user adjusts the angle of cutting arms 136 relative to head support frame 104 and the angle of cutting mechanism 28 to the upper end 134 of cutting arm 136 to place cutting mechanism 28 at the desired position relative to trunk 14.

Once climbing apparatus 10 is on trunk 14, the user adjusts the increment at which it is desired to for climbing apparatus 10 to move up trunk 14. This increment will be set for the particular tree and will typically range between 0.25 inches and 0.5 inches. A dial will be provided on apparatus 10 to set the incremental movement amount. With the control cable 32 plugged into the control unit 156 and power cable 36 plugged into the source of electrical power, such as generator 34, the user is ready to begin the desired maintenance operation. The user operates hand control unit 30 to start and stop climbing mechanism 26 as it moves up trunk 14. Once climbing apparatus 10 reaches the point where the maintenance operation is to be performed, the user will operate the controls to activate the rotating motor 120 to rotate cutting head 24 relative to climbing section 22 and activate saw blade 140 to cut wrapping 18 and/or fronds 20. To perform the desired maintenance operation (i.e., cutting), the climbing apparatus 10 will move up one increment, as set by the user, and then stop to perform the cutting operation to remove wrapping 18 and/or fronds 20. After cutting all around trunk 14, the cutting mechanism 28 pauses and the climbing apparatus 10 moves up another increment. The climbing apparatus 10 continues this stepwise move then cut process up the trunk until the desired maintenance operation is completed. Once the operation is completed, the user operates the controls to reverse the direction of travel and bring climbing apparatus 10 back to the bottom of trunk 14. The climbing apparatus 10 is disconnected from the source of electrical power 34, the cutting head 24 is disconnected from head support rail 48 and removed from trunk 14 by separating one or more head sections 106, 108 and 110 and then the climbing section 22 is removed from trunk 14 by separating one or more support sections 54, 56 and 58.

While there are shown and described herein specific forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to any dimensional relationships set forth herein and modifications in assembly, materials, size, shape, and use. For instance, there are numerous components described herein that can be replaced with equivalent functioning components to accomplish the objectives of the present invention.

What is claimed is:

1. A self-propelled climbing apparatus for climbing a trunk of a tree and performing a maintenance operation on said tree, said climbing apparatus comprising:
   a climbing section having a main support frame and one or more climbing mechanisms attached to said main support frame, said main support frame defining an interior space and having two or more support sections comprising at least a first support section and a second support section, said first support section and second support section configured to separate so as to receive said trunk in said interior space, each of said one or more climbing mechanisms comprising a drive mechanism operatively connected to an upper drive assembly and a lower drive assembly, each of said upper drive assembly and said lower drive assembly having one or more wheels configured to rotatably engage said trunk to move said climbing apparatus up or down said trunk; and
   a maintenance section detachably mounted to said climbing section, said maintenance section configured to perform said maintenance operation on said tree, said maintenance section having a head support frame, means for rotatably and detachably mounting said head support frame to said climbing section and means for rotating said head support frame relative to said climbing section, said mounting means comprising one or more head clamping mechanisms having a clamp and a clamping roller and said rotating means comprising a rotating motor, one or more drive rollers and one or more upper rail rollers.

2. The climbing apparatus according to claim 1 further comprising a head support rail attached to said main support frame by a plurality of head support members, said maintenance section rotatably mounted to said head support rail so as to allow said maintenance section to rotate relative to said climbing section.

3. The climbing apparatus according to claim 1, wherein said upper drive assembly comprises one or more upper wheels rotatably supported above said main support frame by one or more upper arms and said lower drive assembly comprises one or more lower wheels rotatably supported below said main support frame by one or more lower arms.

4. The climbing apparatus according to claim 3, wherein each of said upper arms and said lower arms are pivotally connected to said main support frame so as to pivot said upper wheels and said lower wheels into and out of said interior space.

5. The climbing apparatus according to claim 4 further comprising means for biasing said upper wheels and said lower wheels toward said interior space and against said trunk so as to maintain engagement of said upper wheels and said lower wheels against said trunk while said climbing apparatus is climbing or descending said trunk.

6. The climbing apparatus according to claim 3 further comprising means for laterally biasing each of said one or more upper wheels towards each other and each of said one or more lower wheels towards each other, said laterally biasing means configured to substantially force each of said upper wheels and each of said lower wheels to move in unison and improve contact with said trunk.

7. The climbing apparatus according to claim 1, wherein each of said clamping roller, said drive rollers and said upper rail rollers are rotatably mounted on said head support frame and configured to rotatably engage a head support rail supported on said main support frame by a plurality of head support members.

8. The climbing apparatus according to claim 7, wherein said maintenance section is a cutting head having one or more cutting mechanisms attached to said head support frame.

9. The climbing apparatus according to claim 1, wherein said maintenance section is a cutting head having one or more cutting mechanisms attached to a head support frame, said head support frame attached to said climbing section.

10. The climbing apparatus according to claim 9, wherein each of said cutting mechanisms are attached to an upper end of a cutting support arm, each of said cutting support arms extending generally upwardly from said head support frame and into said interior space so as to dispose said cutting mechanism near or against said trunk.

11. The climbing apparatus according to claim 10, wherein a lower end of each of said cutting support arms is pivotally attached to said head support frame and each of said cutting mechanisms is pivotally attached to said upper end of said cutting support arm.

12. The climbing apparatus according to claim 1 further comprising a tent assembly having a tent attached to a tent support ring, said tent support ring connected to said main support frame by one or more ring support members, said tent assembly defining a debris chamber configured to direct debris from said maintenance operation generally down towards the bottom of said tree.

13. A self-propelled climbing apparatus for climbing a trunk of a tree and performing a maintenance operation on said tree, said climbing apparatus comprising:
a climbing section having a main support frame and one or more climbing mechanisms attached to said main support frame, said main support frame defining an interior space and having two or more support sections comprising at least a first support section and a second support section, said first support section and second support section configured to separate so as to receive said trunk in said interior space, each of said one or more climbing mechanisms comprising a drive mechanism operatively connected to an upper drive assembly and a lower drive assembly, each of said upper drive assembly and said lower drive assembly having one or more upper wheels configured to rotatably engage said trunk to move said climbing apparatus up or down said trunk; and
a maintenance section having a head support frame attached to said climbing section, said maintenance section configured to perform said maintenance operation on said tree, wherein said maintenance section is a cutting head having one or more cutting mechanisms attached to said head support frame, each of said cutting mechanisms are pivotally attached to upper end of a cutting support arm, each of said cutting support arms extending generally upwardly from said head support frame and into said interior space so as to dispose said cutting mechanism near or against said trunk, a lower end of each of said cutting support arms is pivotally attached to said head support frame.

14. The climbing apparatus according to claim 13, wherein said maintenance section further comprises means for rotatably and detachably mounting said head support frame to said head support rail and means for rotating said head support frame relative to said climbing section.

15. The climbing apparatus according to claim 13, wherein said climbing mechanism further comprises means for biasing said upper wheels and said lower wheels toward said interior space and against said trunk so as to maintain engagement of said upper wheels and said lower wheels against said trunk while said climbing apparatus is climbing or descending said trunk.

16. The climbing apparatus according to claim 13 further comprising means for laterally biasing each of said one or more upper wheels towards each other and each of said one or more lower wheels towards each other, said laterally biasing means configured to substantially force each of said upper wheels and each of said lower wheels to move in unison and improve contact with said trunk.

17. The climbing apparatus according to claim 13, wherein said maintenance section is a cutting head having one or more cutting mechanisms attached to said head support frame.

18. The climbing apparatus according to claim 17, wherein each of said cutting mechanisms are pivotally attached to an upper end of a cutting support arm, a lower end of said cutting support arm pivotally attached to said head support frame, each of said cutting support arms extending generally upwardly from said head support frame and into said interior space so as to dispose said cutting mechanism near or against said trunk.

19. The climbing apparatus according to claim 17, wherein said head support frame is rotatably mounted to said head support rail and said climbing apparatus further comprises means for rotating said head support frame relative to said climbing section.

20. A self-propelled climbing apparatus for climbing a trunk of a tree and performing a maintenance operation on said tree, said climbing apparatus comprising:
a climbing section having a main support frame and one or more climbing mechanisms attached to said main support frame, said main support frame defining an interior space and having two or more support sections comprising at least a first support section and a second support section, said first support section and second support section configured to separate so as to receive said trunk in said interior space, each of said one or more climbing mechanisms comprising a drive mechanism operatively connected to an upper drive assembly and a lower drive assembly, said upper drive assembly having one or more upper wheels rotatably supported above said main support frame by one or more upper arms, said lower drive assembly having one or more lower wheels rotatably supported below said main support frame by one or more lower arms, each of said upper wheels and said lower wheels configured to rotatably engage said trunk to move said climbing apparatus up or down said trunk, said climbing mechanism further comprising means for biasing each of said upper wheels and said lower wheels toward said interior space and against said trunk so as to maintain engagement of said upper wheels and said lower wheels against said trunk while said climbing apparatus is climbing or descending said trunk;
a head support rail attached to said main support frame by a plurality of head support members; and
a maintenance section configured to perform said maintenance operation on said tree, said maintenance section having a head support frame attached to said climbing section, means for rotatably and detachably mounting said head support frame to said head support rail and means for rotating said head support frame relative to said climbing section, said mounting means comprising one or more head clamping mechanisms having a clamp and a clamping roller and said rotating means comprising a rotating motor, one or more drive rollers and one or more upper rail rollers.

21. The climbing apparatus according to claim 20, wherein said maintenance section is a cutting head having one or more cutting mechanisms attached to said head support frame.

22. The climbing apparatus according to claim 21, wherein each of said cutting mechanisms are pivotally attached to an upper end of a cutting support arm, a lower end of said cutting support arm pivotally attached to said head support frame, each of said cutting support arms extending generally upwardly from said head support frame and into said interior space so as to dispose said cutting mechanism near or against said trunk.

* * * * *